United States Patent [19]
Yokozawa et al.

[11] Patent Number: 5,740,369
[45] Date of Patent: Apr. 14, 1998

[54] INFORMATION DELIVERY SYSTEM AND PORTABLE INFORMATION TERMINAL

[75] Inventors: Tooru Yokozawa, Chigasaki; Hiroshi Shimizu; Wataru Kitayama, both of Yokohama; Hidefumi Goto, Yokosuka; Tadashi Kuwabara, Yokohama; Tomohiro Esaki, Yokohama; Yoshihiro Yamada, Yokohama, all of Japan

[73] Assignee: Hitachi, Ltd., Tokyo, Japan

[21] Appl. No.: 470,219

[22] Filed: Jun. 6, 1995

[30] Foreign Application Priority Data

Jun. 17, 1994 [JP] Japan ................................. 6-135362
Jul. 4, 1994 [JP] Japan ................................. 6-152199

[51] Int. Cl.⁶ ........................................................ G06F 15/40
[52] U.S. Cl. ...................... 395/200.47; 395/201; 235/382; 235/382.5; 235/384; 370/313
[58] Field of Search ............................. 235/375, 380, 235/382, 382.5, 384; 395/201, 226; 364/514 R

[56] References Cited

U.S. PATENT DOCUMENTS

| | | | |
|---|---|---|---|
| 5,025,373 | 6/1991 | Keyser, Jr. et al. | 235/379 |
| 5,191,611 | 3/1993 | Lang | 380/25 |
| 5,339,239 | 8/1994 | Manabe et al. | 395/201 |
| 5,517,407 | 5/1996 | Weiner | 395/751 |
| 5,521,966 | 5/1996 | Friedes et al. | 379/91 |
| 5,578,808 | 11/1996 | Taylor | 235/380 |

*Primary Examiner*—Douglas W. Olms
*Assistant Examiner*—Min Jung
*Attorney, Agent, or Firm*—Antonelli, Terry, Stout, & Kraus, LLP

[57] ABSTRACT

A transmitting management apparatus transmits information having an identification number corresponding to a portable information terminal to which information is to be delivered and/or having a sorting code identifying the information. The portable information terminal receiving the transmitted information selectively acquires and stores proper information by referring to the identification number and/or the sorting code of the received information, and displays the proper information on a display means.

14 Claims, 25 Drawing Sheets

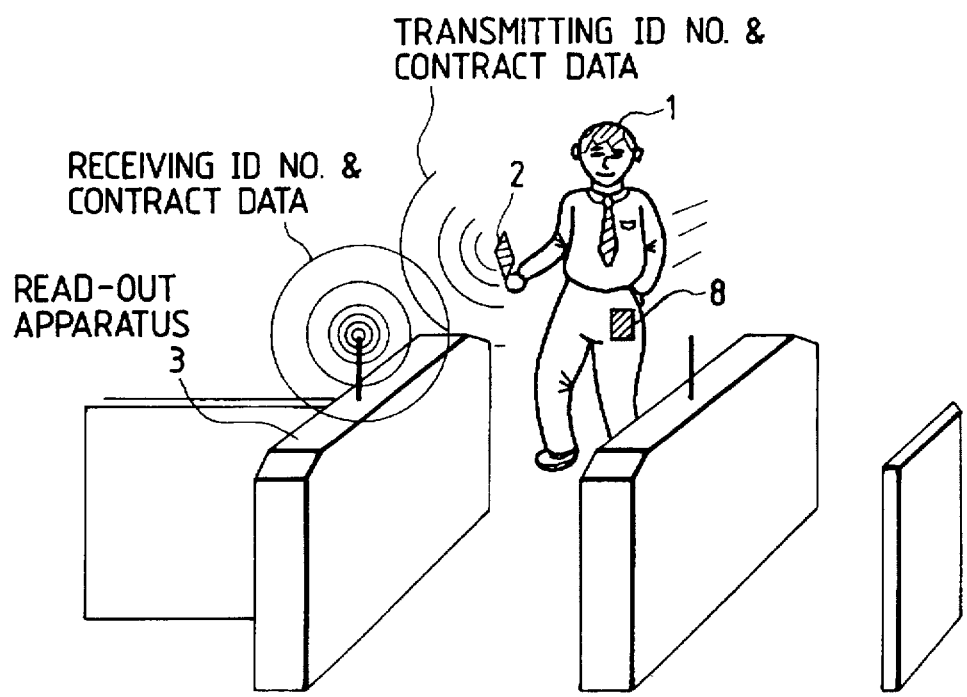
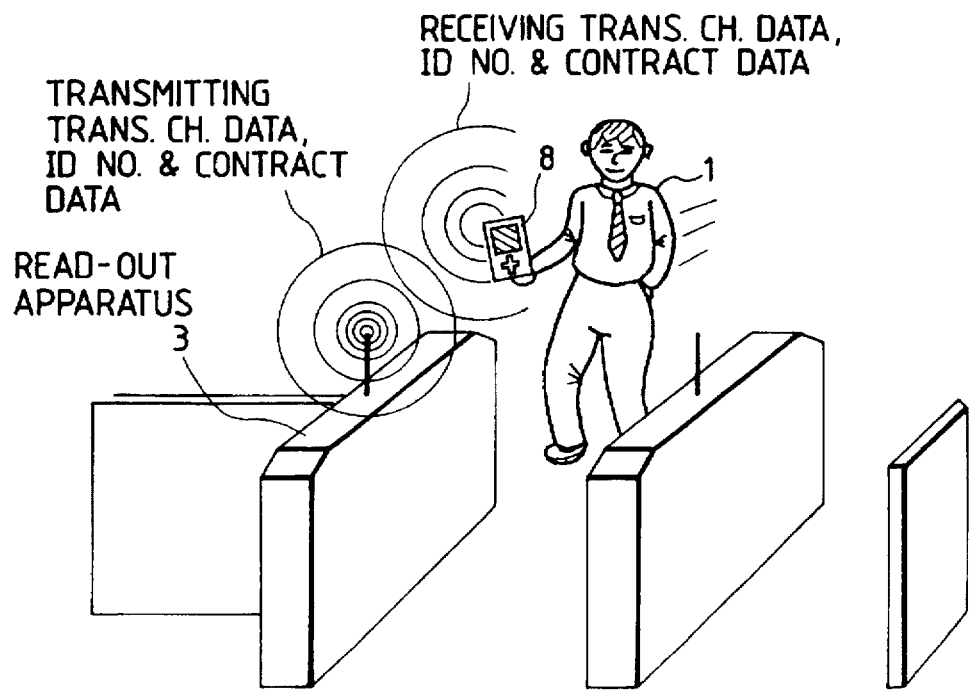

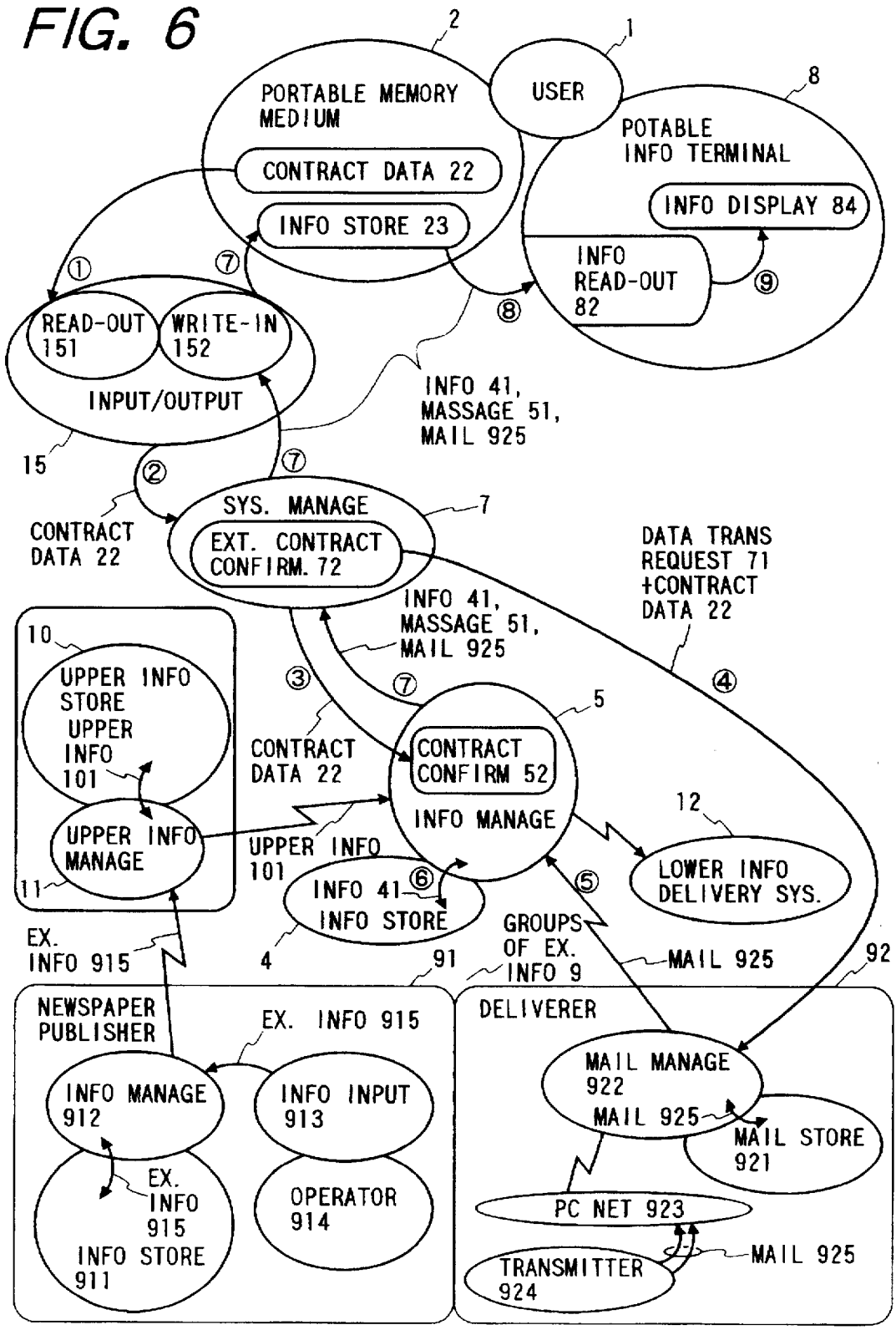

UPSIDE-DOWN STATE

FIG. 24

INDIVIDUAL ID NO. | INFO (DATA BASED ON CONTRACT)
81 | 41

FIG. 25

CLASSIFICATION CODE | INFO (DATA CORRESPONDING TO CLASSIFICATION CODE) | CLASSIFICATION CODE | INFO | ...
836 | 41

FIG. 26

INDIVIDUAL ID NO. | CLASSIFICATION CODE | INFO | CLASSIFICATION CODE | INFO | ...
81 | 836 | 41

INFORMATION DELIVERY SYSTEM AND PORTABLE INFORMATION TERMINAL

BACKGROUND OF THE INVENTION

The present invention relates to an information delivery system and portable information terminal, and more particularly relates to an information delivery system and portable information terminal in which the portable information terminal automatically receives desirous information from a data base storing various kinds of information.

The most common information delivery systems providing information concerning society matters, the economy, entertainment and leisure, and so on are newspapers, television broadcasts, radio broadcasts, magazines and similar information media. However, it is not easy for these information delivery systems to regularly, continuously and speedily deliver only information which the user himself wants.

In resent years, there have been provided textual information multiple broadcast systems using television broadcasts and personal computer communication systems in which desirous information can be obtained by accessing a data base which stores various kinds of information. These systems are described in Japanese Patent Application Laid-Open No. 60-46181 (1985) and Japanese Patent Application Laid-Open No. 4-27739 (1992).

However, in order to obtain desirous information through these system, it is necessary for a user to operate an information terminal every time he or she wants information. Therefore, obtaining information which is varying every moment is a troublesome operation.

SUMMARY OF THE INVENTION

An object of the present invention is to provide an information delivery system and a portable information terminal with which a user can automatically and continuously obtain desired information without going through a troublesome operation.

Another object of the present invention is to provide an information delivery system and a portable information terminal with which a user can automatically and speedily obtain desired information without going through a troublesome operation.

The objects of the present invention can be attained by providing an information delivery system and a portable information terminal in which information read out from an information storing apparatus, which stores various kinds of information, is transmitted along with an identification number corresponding to a portable information terminal and/or a classification code of said information, and the portable information terminal or a portable memory medium receiving the transmitted information selectively acquires the proper information by referring to said identification number and/or said classification code.

As a user having the portable information terminal with him enters into a certain area through an entrance of the area, an information transmitting device transmits information to be delivered to the portable information terminal in said area along with an identification number. And, the information transmitting device also transmits information to be delivered to unspecified portable information terminals by adding said classification code to the transmitted information.

The portable information terminal receives and stores information agreeing with a preset identification number and/or a classification code and operates to display the information received and stored or information received and stored by a portable memory medium.

BRIEF DESCRIPTION OF THE DRAWINGS

FIG. 4 is diagrammatic view showing another arrangement for data receiving and transmitting between a portable memory medium and a system apparatus (a read-out apparatus) at an entrance of a specified area (a ticket inspection gate) in the first embodiment of an information delivery system accordance with the present invention.

FIG. 5 is a diagrammatic view showing a further arrangement for data receiving and transmitting between a portable memory medium and a system apparatus (a read-out apparatus) at an entrance of a specified area (a ticket inspection gate) in the first embodiment of an information delivery system accordance with the present invention.

FIG. 6 is an explanatory diagram showing the construction and the data flow of a second embodiment of an information delivery system in accordance with the present invention.

FIG. 24 is a data format diagram for transmitting data.

FIG. 25 is a data format diagram for transmitting data.

FIG. 26 is a data format diagram for transmitting data.

DETAILED DESCRIPTION OF THE PREFERRED EMBODIMENTS

The present invention will be described in detail below, referring to the accompanying drawings showing the present invention.

[First Embodiment]

Figure 1:
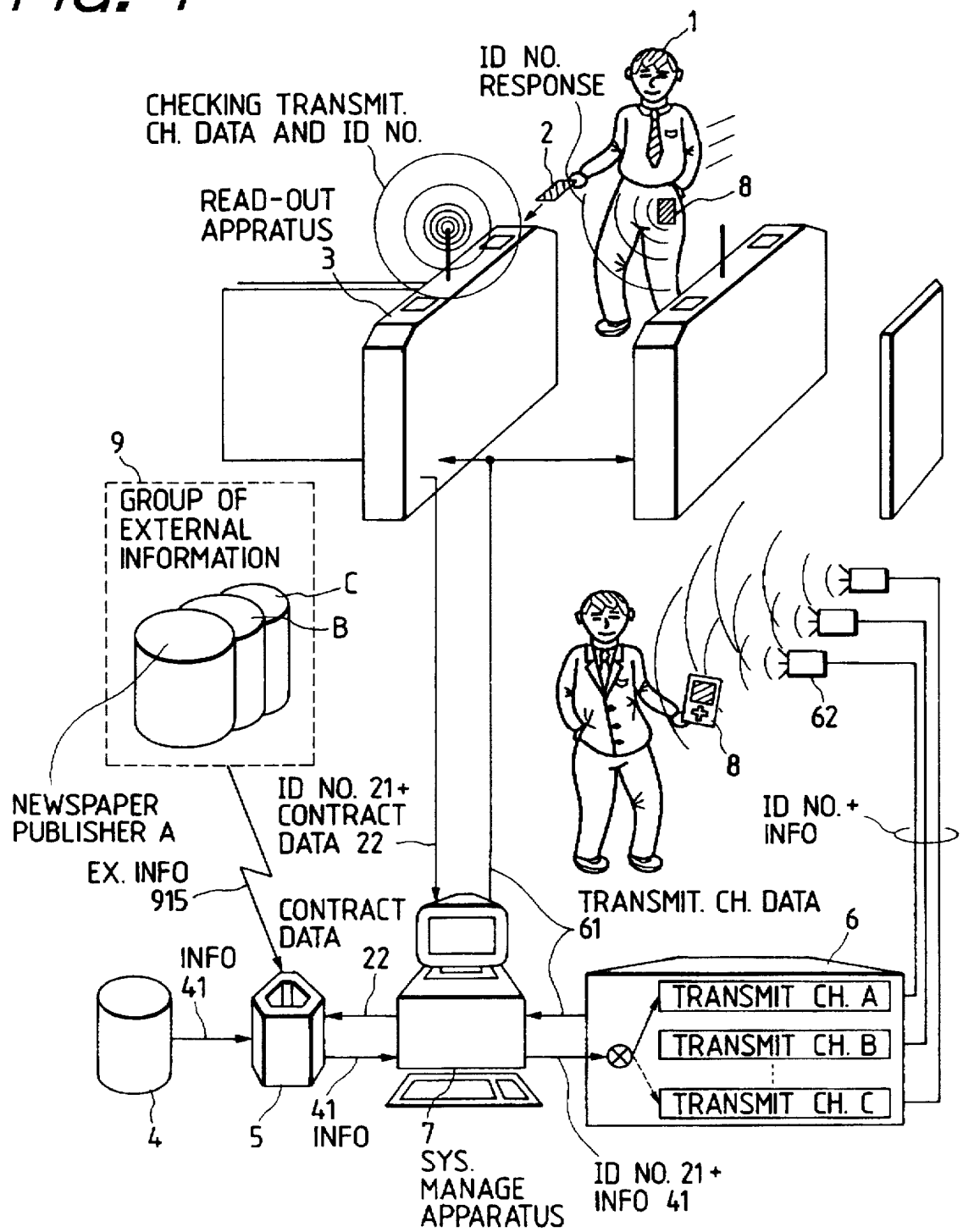
FIG. 1 is a diagrammatic view showing a first embodiment of an information delivery system in accordance with the present invention.

FIG. 1 is a conceptual view showing a first embodiment of an information delivery system in accordance with the present invention. The embodiment is an example of a system which may be used in a railroad or subway station, for example.

In FIG. 1, the reference character 1 denotes a user of the information delivery system, and the reference character 2 denotes a portable memory medium which stores contract information and also serves as a commuter ticket for automatic ticket inspection utilizing a magnetic memory. The reference character 3 denotes a read-out apparatus installed at a ticket inspecting gate which has a function of automatic ticket inspection of the commuter ticket when the portable memory medium 2 is inserted, a function of reading out the contents of a contract from the portable memory medium 2, a function of checking its identification number, and a wireless transmitting and receiving function for specifying transmission channel data assigned to the user when information to be described later is transmitted to the portable information terminal to be described later. The reference character 4 denotes an information storing apparatus which stores various kinds of information, including characters, photographs, graphs and tables. The reference character 5 denotes an information management apparatus for controlling the information storing apparatus 4 to write external information in the information storing apparatus 4 and to read out the information according to the contents of a contract stored in the portable memory medium 2. The reference character 6 denotes a transmitting management apparatus which transmits information read out by the information management apparatus 5 to the railroad yard through the transmitting channel assigned to the user. The reference character 7 denotes a system management apparatus for effecting overall control of the information delivery system in the railroad station and performs control the transmission of various data among the read-out apparatus 3, the information management apparatus 5 and the transmitting management apparatus 6, and for effecting communication control with external systems through the information management apparatus 5. The reference character 8 denotes a portable information terminal which can be easily carried by the user 1 and which has a function for communicating with the read-out apparatus 3, a function for receiving information from the transmitting management apparatus 6, and a function for storing received information and for displaying it to the user 1. The reference character 9 denotes a group of external information sources, for instance, a newspaper publishing company, a magazine publishing company, a personal computer network and so on, which supplies various kinds of desirous information to the user 1 through the information management apparatus 5.

Figure 2:
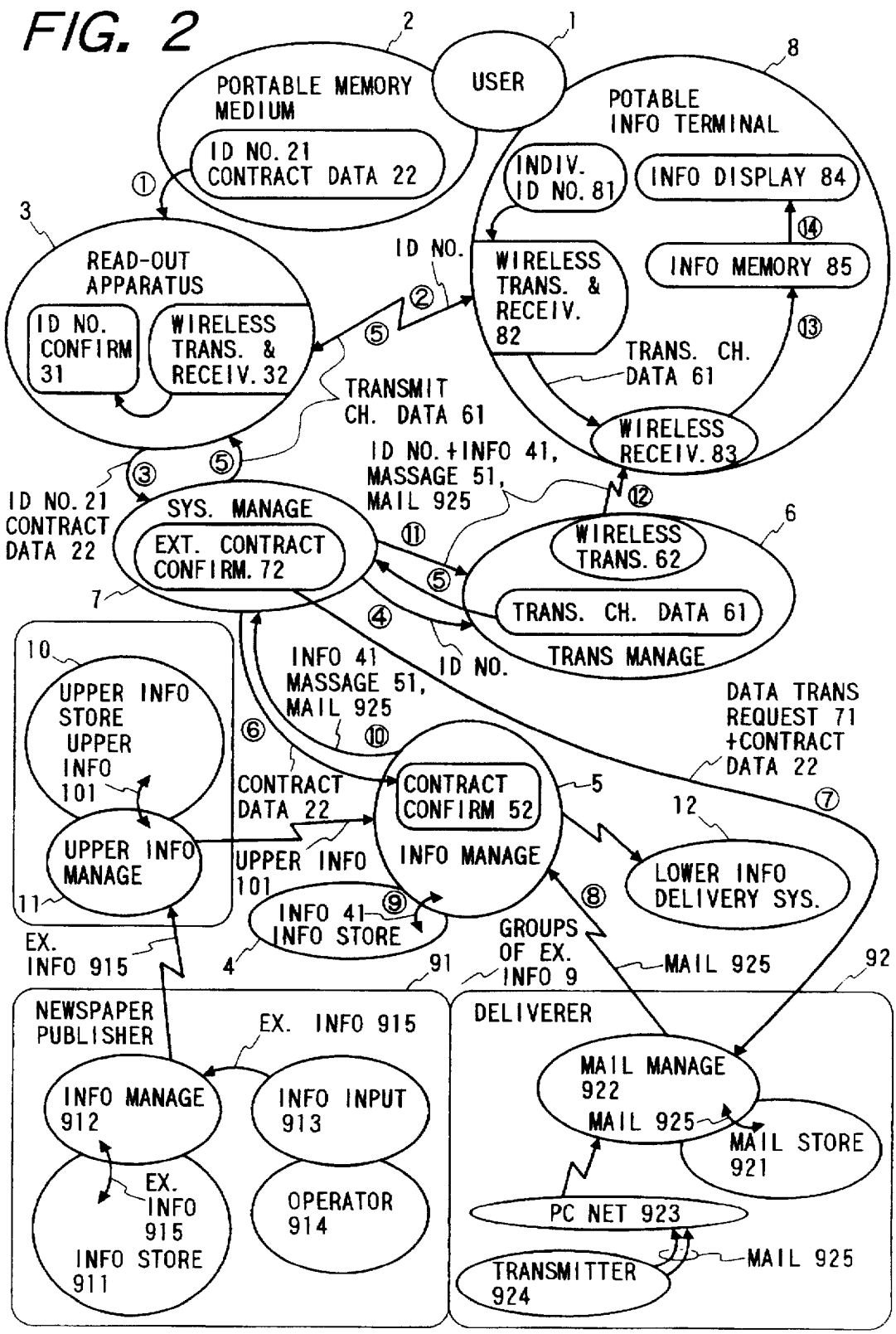
FIG. 2 is an explanatory diagram showing the construction and the data flow of the first embodiment of an information delivery system in accordance with the present invention.

FIG. 2 shows how information or other data is processed in the system of the embodiment having a construction shown in FIG. 1.

In FIG. 2, an identification number 21 of the portable information terminal 8 is stored in the portable memory medium 2 (the same identification number used with the portable information terminal 8 forming a pair with the portable memory medium 2), and contract data 22 is stored in the portable memory medium 2 with which the user 1 contracts. An identification number confirming unit 31 is provided in the reading-out apparatus, and a wireless transmitting and receiving unit 32 is provided in the reading-out apparatus 3. Information 41 is read out from an information storing apparatus 4, and a message 51 is generated by the information management apparatus 5. A contract confirming unit 52 is provided in the information management apparatus 5, and transmitting channel data 61 expresses the channel for transmitting information with a transmitting management apparatus 6. A wireless transmitting unit 62 is provided in the transmitting management apparatus 6 including a transmitter and an antenna for transmitting information toward the yard using radio transmission. A data transmission request 71 is sent from a system management apparatus 7 requesting a group of external information sources 9 to transmit data, and an external contract confirming unit 72 in the system management apparatus 7 confirms the presence or absence of a contract with the group of external information sources 9 and transmits the data transmitting request 71 and the contracting data 22 to a group of external information sources 9. An individual identification number is predetermined for each of the portable information terminals 8. A wireless transmitting and receiving unit in the portable information terminal 8 for performing wireless communication with the reading-out apparatus 3 over a short distance, and a wireless receiving unit 83 is provided in the portable information terminal 8 for receiving the information transmitted from the transmitting management apparatus 6. An information display unit 84 is provided in the portable information terminal 8 for displaying received information, such as characters, photographs, graphs and tables, and an information storing unit 85 is provided in the portable information terminal 8 for storing the received information. A newspaper publishing company 91 supplying information operates as one of the group of external information sources 9, and an information storing apparatus 911 is provided in the newspaper publishing company 91. An information management apparatus 912 is provided in the newspaper publishing company 91, along with an information inputting apparatus 913. An operator 914 in the newspaper publishing company 91 operates to input information through the information inputting apparatus 913, and the reference character 915 denotes external information input from the information input apparatus 913. An information delivery company 92 dealing with information for individual persons operates as one of the group of external information sources 9, and a mail storing apparatus 921 is provided in the information delivering company 92, along with a mail management apparatus 922. A personal computer network 923 is connected to the information delivering company 92, and an information sender 924 sends mail to the information delivering company 92 using the personal computer network 923. The reference character 925 denotes mail to a private person transmitted from the information sender 924.

Further, in the construction of the system of FIG. 2, it is assumed that the information storing apparatuses 4 and the information management apparatuses 5 are installed in main railroad stations (middle scale stations or larger). In a place representing the hub of the whole system, such as a main office of a company, there are an upper class information storing apparatus 10 serving as a source of various information and an upper class information management apparatus 11 from which upper class information 101 is transmitted to each of the information management apparatuses 5. On the other hand, in a railroad station in a lower position having a small number of passengers, there is provided a lower information delivery system 12 to which information is transmitted from the information management apparatus 5. The other blocks and characters in FIG. 2 are the same as those in FIG. 1. The reference characters encircled by O in FIG. 2 (reference characters with ( ), parenthesis, in the description hereinafter) approximately indicate the order of information flow from its starting point to the portable information terminal described below.

The operation of the embodiment will be described below, referring to FIG. 1 and FIG. 2.

It is assumed here that the portable memory medium 2 carried by a user 1 stores the contents of contracts to receive the information concerning society matters from a newspaper publishing company and the mail addressed to the user from a contracting data delivery company 92. Further, it is assumed that the user 1 commutes by train from a middle scale railroad station.

Initially, the user 1 inserts the portable memory medium 2 into the reading-out apparatus 3 at the ticket checking gate to get on a train. Then, the reading-out apparatus 3 reads the contract data 22 and the identification number 21 stored in the portable memory medium 2 (process (1) in FIG. 2) and operates to input the identification number 21 to the identification number confirming unit 31. Next, the wireless transmitting and receiving unit 32 in the reading-out apparatus 3 calls the portable information terminal 8 carried by the user 1 using the identification number 21 (process (2) in FIG. 2). The portable information terminal 8 receiving the wireless radio wave compares the individual identification number 81 stored therein with the required identification number 21. If the both numbers agree with each other, the portable information terminal sends a reply using the wireless transmitting and receiving unit 82.

On receiving the reply from the portable information terminal 8, the identification confirming unit 31 in the reading-out apparatus 3 confirms that the portable information terminal 8 carried by the person having the portable memory medium 8 is a regular address for transmitting the information.

If a confirmation is not obtained, the reading-out apparatus 3 judges that the user 1 is not carrying the portable information terminal 8 and does not perform any process thereafter, but waits for the next user.

On the other hand, on receiving the confirmation described above, the reading-out apparatus 3 transmits the identification number 21 and the contents of contract 22 to the system management apparatus 7 (process (3) in FIG. 2). When the system management apparatus 7 transmits the identification number 21 to the transmission management apparatus 6 (process (4) in FIG. 2), the transmission management apparatus 6 assigns a least crowded channel among the plural transmitting channels to the portable information terminal 8 carried by the user having the portable memory medium 2 of identification number 21, and transmits the transmitting channel data 61 indicating the assigned channel to the reading-out apparatus 3 through the system management apparatus 7 (process (5) in FIG. 2). Then the transmitting channel data 61 transmitted to the reading-out apparatus 3 is transmitted to the portable information terminal 8 from the wireless transmitting and receiving unit 32 (the same process (5) in FIG. 2), and thereby the data in the channel is set to the wireless receiving unit 83 and preparation of the portable information terminal for receiving data is completed.

The operation described above is performed during the time in which the user 1 passes through the ticket checking gate, from the time of inserting the portable memory medium 2 into the reading-out apparatus 3 to the time of receiving the portable memory medium 2 from the reading-out apparatus 3. Then, the user 1 passes through the reading-out apparatus 3 and goes to a platform.

On the other hand, the delivery side of the information delivery system of this embodiment begins the following operation in order to transmit information to the portable information terminal 8.

Initially, the system management apparatus 7 transfers the contract data 22 to the contract confirming unit 52 in the information management apparatus 5 (process (6) in FIG. 2), and at the same time confirms the presence or absence of a contract between the user 1 and the group of external information sources 9 in the external contract confirming unit 72.

Since the user 1 has made a contract for receiving mail to a private person with the delivery company 92, as described above, the external contract confirming unit 72 transfers a transmission request 71 for requesting transmission of mail 925 and the contract data 22 to the mail management apparatus 922 in the delivery company 92 (process (7) in FIG. 2).

On receiving the transmission request 71 and the contract data 22 described above, the mail management apparatus 922 in the delivery company 92 extracts the mail 925 addressed to the user 1 stored in the mail storing apparatus 921 and transmits it to the information storing apparatus 5 (process (8) in FIG. 2).

The contract confirming unit 52 in the information management apparatus 5 compares the data on the term of the contract with the current date. The contract confirming unit then generates a message 51 indicating impossibility of use due to expiration of the contract when the term of the contract is past, and generates a message 51 proposing that the user renew the contract.

After completing the contract confirmation, based on the contents of the contract, the information management apparatus 5 extracts, in this embodiment, a social article in a newspaper as the information 41 from the information storing apparatus 4 (process (9) in FIG. 2), and transmits the information 41 to the system management apparatus 7 by combining the message 51 generated previously and the mail 925 transmitted from the delivery company 92 (process (10) in FIG. 2).

On receiving the information 41 and the massage 51 and the mail 925, the system management apparatus 7 transfer them by further adding the identification number to the transmitting management apparatus 6 (process (11) in FIG. 2).

On receiving the identification number 81 (=identification number 21) and the information 41 and the massage 51 and the mail 925, the transmitting management apparatus 6 sets the transmitting channel assigned to the identification number in the wireless transmitting unit 62 to transmit the four kinds of the information described above through the antenna installed in the yard (process (12) in FIG. 2).

With the operation described above, information specified in the contract is automatically sent to the portable information terminal 8.

When the information sent from the wireless transmitting unit 62 reaches the channel in which the portable information terminal 8, carried by the user 1 walking toward the platform, is kept in a stand-by state, the wireless receiving unit 83 checks the identification number in the first part of the received information data with the individual identification number 81. If the identification numbers agree with each other, the information is sequentially stored in the information storing unit 85, since the information following the identification number is information addressed to the portable information terminal 8 (process (13) in FIG. 2).

Finally, the information stored in the information storing unit 85 is displayed on the information displaying unit 84 by operation of the user 1 to read the social article of the newspaper and the mail addressed to the user (process (14) in FIG. 2).

According to the embodiment, as described above, the user 1 can obtain information he wants through an ordinary action, such as passing through an automatic ticket checking gate in order to get on a train, without any special operation. If the user 1 uses a train every day, he can consequently obtain information continuously.

The contract confirming unit 52 in the information management apparatus 5 may have a function of confirming the section of railroad on which the user travels in addition to confirming the term of the contract, as described above. If the information is not delivered, for example, in the case where the user 1 gets on a train from a station outside the section of railroad the user normally commutes on by adding this function to the information management apparatus 5, the capacity and construction of the system can be designed in an optimum manner, since the number of contract users in each computer section can be obtained. On the other hand, when it is required to deliver information to a user getting on a train from a station outside the contract commuter section, it is possible to deliver the most appropriate information for the contract commuter section to the user. For example, even if a user having a contract in the area of Tokyo gets on a train from a station in the area of Osaka, information on the area of Tokyo can be delivered to the user.

Although details are not described above, the information 41 stored in the information storing apparatus 4 may include phonetic information as well as textual information and graphic information in analog and digital data form. In order to display the information using the information displaying unit 84 for such data, the portable information terminal 8 may be provided with a function of regenerating voice using a speaker or a ear phone, as well as a function capable of displaying textual information, graphic information, and phonetic information in analog and digital data form on a display, such as a liquid crystal display, a cathode ray tube display and the like.

Although the description above is directed to an example where the railroad station has an information management apparatus 5 and an information storing apparatus 4, it is not economical from the standpoint of capital investment for a small scale railroad station having a small number of boarding passengers to be equipped with an apparatus storing a massive amount of information. Therefore, in such a case, the system construction shown in FIG. 3 may be provided.

Figure 3:
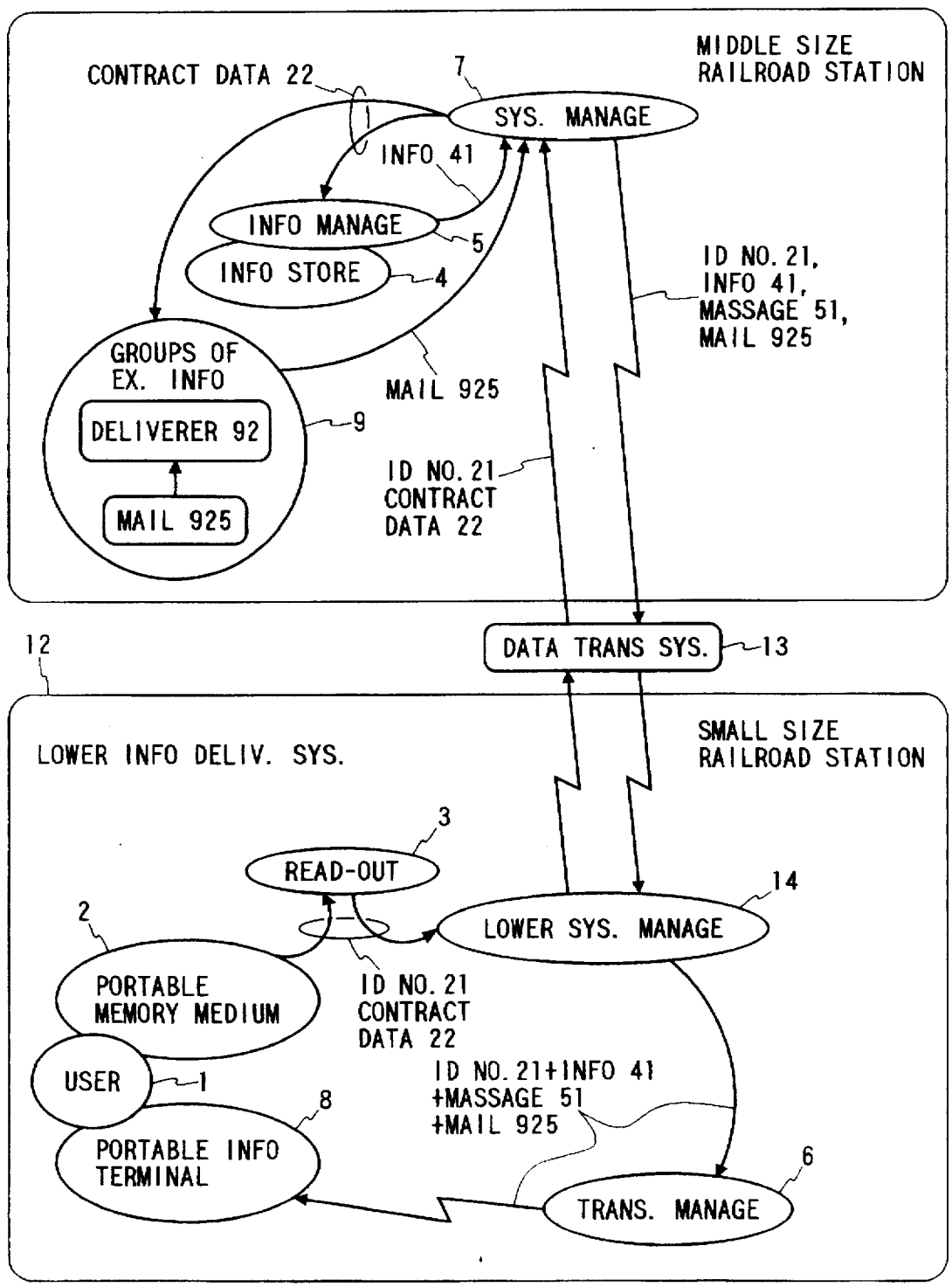
FIG. 3 is an explanatory diagram showing an arrangement for data transmission between a middle scale railroad station and a small scale railroad station in the first embodiment of an information delivery system in accordance with the present invention.

That is, as shown in FIG. 3, for a small scale railroad station, there are provided a lower information delivery system 12, composed of a reading-out apparatus 3, a transmission management apparatus 6 and a lower system management apparatus 14, which have nearly the same functions as those installed in a middle scale railroad station, and a data transmitting apparatus 13, so as to utilize the information storing apparatus 4 and the information management apparatus 5, which are installed in a middle or larger scale railroad station, as an upper class system.

By doing so, an identification number 21 and contract data 22 read out from a portable memory medium 2 of a user 1 using the lower information delivery system 12 are transmitted from the lower system management apparatus 14 to the system management apparatus 7 in the upper system through a data transmitting system 13. On the other hand, information extracted from the information storing apparatus 4 in the upper system, according to the terms of the contract, is transmitted to the lower system management apparatus 14 using the system management apparatus 7 and the data transmitting system 13. Then, in the lower information delivery system 12, the transmitted information is transmitted to the portable information terminal 8 through the transmission management apparatus 6. Thereby, the user 1 can obtain the same service as in a middle or larger scale railroad station.

In a case where the user 1 is under contract to an external information company (for instance, the data delivery company 92), information according to the terms of the contract is transmitted from an external information system to the system management apparatus 7 (the information management apparatus 5) in the upper information delivery system through the data transmitting system 13 similar to the case of the middle or lager scale railroad station described above. The information transmitted from the outside to the upper system management apparatus 7 is transmitted to the lower information delivery system 12 through the data transmitting system 13. Therefore, the user 1 can obtain the same service as in a middle or larger scale railroad station.

Although the user 1 inserts the portable memory medium 2 into the reading-out apparatus 3 in this embodiment, it is possible to provide a system as shown in FIG. 4. That is, by providing a function to receive a command signal from the reading-out apparatus 3 over the air and a function to transmit the contract data and the like, which is internally stored, over the air to the portable memory medium 2, and by providing a function to radiate a command signal to allow the portable memory medium 2 to transmit the data over the air and a function to receive the contract data and the like which has been transmitted, the contract data and the like can be transmitted to the system management apparatus 7 and the user 1 can access the information in the portable information terminal 8 in a manner similar to the above only by passing through the reading-out apparatus 3 without inserting the portable memory medium 2 in the reading-out apparatus 3.

Further, by integrating the function of the portable information terminal 8 aforementioned and the function of the portable memory medium 2 of FIG. 4 described above, that is, by providing a function to store the contract data and the like and a function to transmit the data in response to a command signal from the reading-out apparatus 3 over the air to the portable information terminal 8, itself having function to receive and display information within a specified area, the contract data and the like can be transmitted to the system management apparatus 7 and the user 1 can access the information in the portable information terminal 8 in a manner similar to the above only by passing through the reading-out apparatus 3, but without inserting the portable memory medium 2 in the reading-out apparatus 3. In addition to this, there arises an advantage in that it is not necessary to carry the portable memory medium 2 and the portable information terminal 8 separately. Therein, the individual identification number 81 may be rewritable so as to use one terminal by plural users. By doing so, even use of the terminal is changed to another user, the identification number 21 stored in the portable memory medium carried by the new user can be set. Therefore, the new user can receive the information contracted for by the new user using the terminal commonly used by the two users.

[Second Embodiment]

FIG. 6 is an explanatory diagram showing the construction and the data flow of a second embodiment of an information delivery system in accordance with the present invention. In the figure, parts which are equivalent to parts in the first embodiment are indicated by the same reference numbers, and an explanation thereof is omitted in order to avoid redundant description (the same is true in each of embodiments below).

In FIG. 6, the reference character 23 denotes an information storing unit for storing a great volume of information in a portable memory medium 2. An input/output apparatus 15 is provided for reading and writing to the portable memory medium 2 and this apparatus also has an automatic ticket checking function for commuter tickets. A reading-out unit 151 is provided in the input/output apparatus 15 for reading out contract data 22 stored in the portable memory medium 2, as well as a writing unit 152 for storing information to the portable memory medium 2. An information reading-out unit 86 is provided in the portable information terminal 8, which has a port for the portable memory medium 2 to read out information stored in the information storing unit 23 in the inserted portable memory medium 2.

Although in the first embodiment described above the information display unit 84 in the portable information terminal 8 displays data received from the information memory unit 85, in this embodiment the information display unit 84 displays data received from the information reading-out unit 86.

The parts other than described above are the same as in the first embodiment.

In the following description of the operation of this embodiment, it is assumed that the portable memory medium 2 carried by a user 1 stores the terms of contracts to receive information concerning society matters from a newspaper publishing company 91 and mail addressed to the user from a contracting data delivery company 92. Further, it is assumed that the user 1 commutes by train from a middle scale railroad station.

The operation of the embodiment will be described below, referring to FIG. 6. One difference in this embodiment from the first embodiment is that, although in the first embodiment information is directly transmitted to the portable information terminal 8 over the air, this embodiment employs an indirect method where information is first stored in the portable memory medium 2 and then the information is read out from the portable memory medium 2 using the portable information terminal 8.

Initially, the user 1 inserts the portable memory medium 2 into the input/output apparatus 15 at the ticket checking gate to gain access to a train similar to the first embodiment. Then, the input/output apparatus 15 reads the contract data 22 stored in the portable memory medium 2 (process (1) in FIG. 6), and transmits the contract data to the system management apparatus 7 (process (2) in FIG. 6).

After this is, like the first embodiment, the system management apparatus 7 transmits the contract data 22 to the information management apparatus 5 (process (3) in FIG. 6), and sends a transmission request signal 71 for mail 925 to the delivery company 92 (process (4) in FIG. 6). The information management apparatus 5 generates a message 51 after confirmation of the contract and receives the mail 925 from the delivery company 92 (process (5) in FIG. 6), extracts the society information 41 stored in the information storing apparatus 4 (process (6) in FIG. 6), and transmits this information together to the system management apparatus 7 (process (7) in FIG. 6).

On receiving the information 41, the message 51 and the mail 925 the system management apparatus 7 transmits them to the writing unit 152 in the input/output apparatus 15 (process (7) in FIG. 6), and the writing unit 152 writes the information into the information storing unit 23 in the portable memory medium 2.

The series of the above operations are performed during the period in which the user 1 inserts the portable memory medium 2 into the input/output apparatus 15 and receives it again, and the information the user 1 wants is delivered at the time when the user 1 receives the portable memory medium 2.

In order to read the information, the user 1 inserts the portable memory medium 2 having various kinds of information into the information reading-out unit 86 in the portable information terminal 8 carried by the user (process (8) in FIG. 6), and by doing so, a stored table of contents is read out and displayed on the information displaying unit 84 (process (9) in FIG. 6).

Then, the user 1 can read the society articles he wants and the mail addressed to him.

As described above, according to this embodiment, the user 1 can obtain information he wants in response to an ordinary action, such as passing through an automatic ticket checking gate in order to take a train, without any special operation. If the user 1 uses a train every day, he can consequently obtain information continuously, though the portable memory medium 2 has to be inserted into the portable information terminal 8 so that the information will be read out from the portable memory medium 2 in the final stage.

Further, by writing information in the portable memory medium 2 in accordance with this embodiment, it is possible to reduce the cost of the system and to prevent a private communication from being picked up through interception of the radio waves, since transmitting and receiving over the air are not required and the assigning of a transmitting channel is not required either, in contrast to the first embodiment.

[Third Embodiment]

Figure 7:
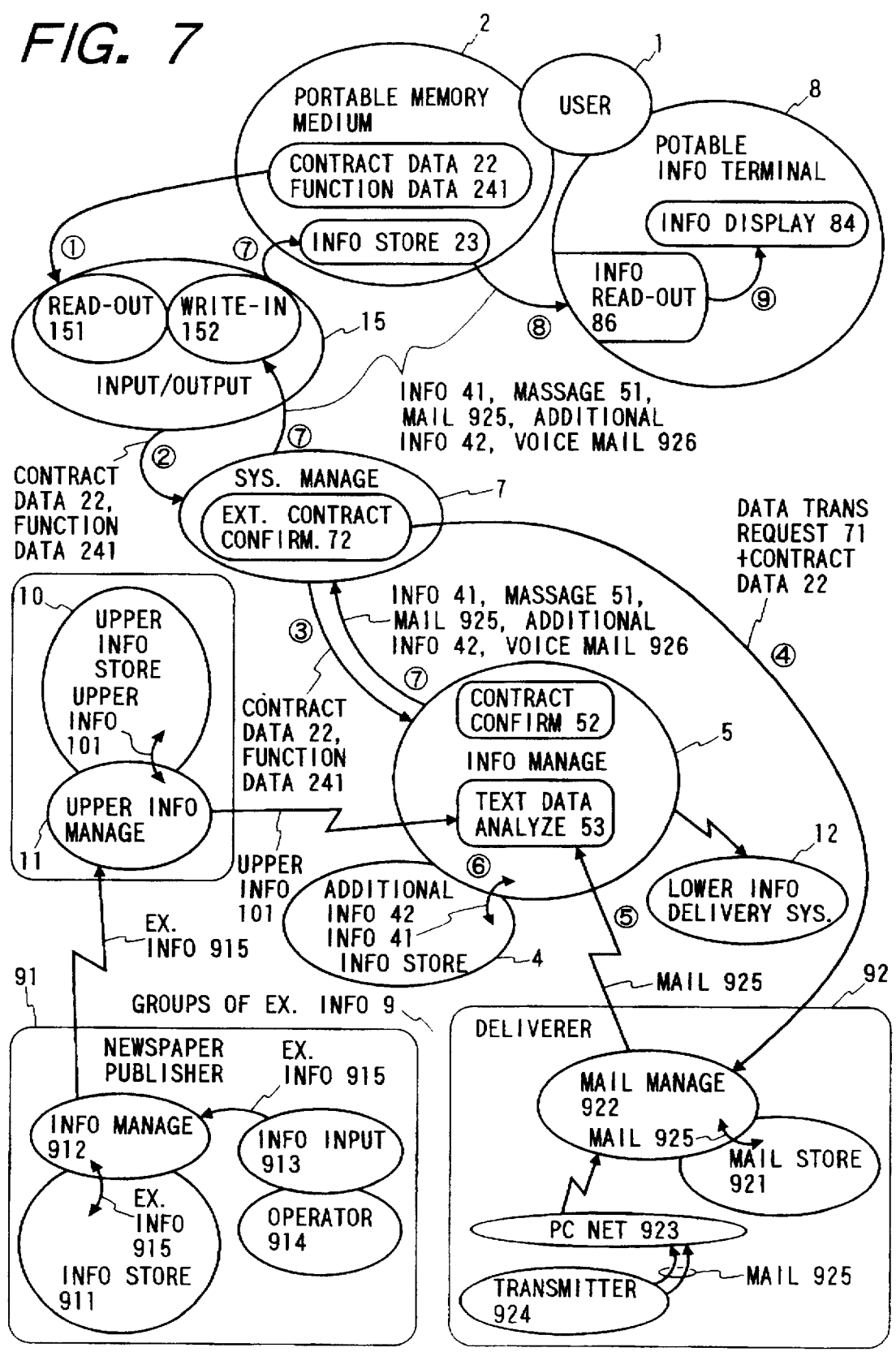
FIG. 7 is an explanatory diagram showing the construction and the data flow of a third embodiment of an information delivery system in accordance with the present invention.

FIG. 7 is an explanatory diagram showing the construction and the data flow of a third embodiment of an information delivery system in accordance with the present invention.

In FIG. 7, the reference character 241 denotes functional data stored in the portable memory medium 2, indicating presence or absence of an information display function by voice or braille for the portable information terminal 8. A text data analyzing unit 53 in the information management apparatus 5 analyzes textual information data contained in upper class information 101 of the upper information storing apparatus 10 or in mail 925 of the group of external information sources 9 to convert this information into hiragana (Japanese cursive syllabary) data and syllable data. The reference character 42 denotes additional information stored in the information storing apparatus 4, which contains the information 41 (upper information 101) described above, as well as pairs of hiragana data and syllable data. The reference character 926 denotes a voice mail converted from the mail 925 using the text data analyzing unit 53.

The information management apparatus 5 in this embodiment operates to extract the additional information 42 depending on the function of the portable information terminal 8, and the information display unit 84 in the portable information terminal 8 operates to output the additional information 42 and the voice mail 926 by voice, in addition to the function displaying information.

The parts other than described above are the same as in the second embodiment.

In the following description of the operation of the embodiment, it is assumed that the portable memory medium 2 carried by a user 1 stores the terms of contracts to receive information concerning society matters from a newspaper publishing company 91 and the mail addressed to the user from a contracting data delivery company 92. Further, it is assumed that the user 1 commutes by train from a middle scale railroad station.

The operation of the embodiment will be described below, referring to FIG. 7. One difference in this embodiment from the second embodiment is that the portable information terminal 8 has a phonetic output function so that the user 1 can obtain textual information in a form like listening to the radio using an earphone.

Initially, the user 1 inserts the portable memory medium 2 into the input/output apparatus 15 at the ticket checking gate to take a train similar to the second embodiment. Then, the input/output apparatus 15 reads the contract data 22 stored in the portable memory medium 2 (process (1) in FIG. 7), and transmits the contract data to the system management apparatus 7 (process (2) in FIG. 7).

After this is, like the second embodiment, the system management apparatus 7 transmits the contract data 22 to the information management apparatus 5 and functional data 24 expressing the function of the terminal stored in the memory medium is added to the contract data 22 sent to information manager 5 (process (3) in FIG. 7), and sends a transmission request signal 71 for mail 925 to the delivery company 92 (process (4) in FIG. 7).

The information management apparatus 5 generates a message 51 after confirmation of the contract and receives the mail 925 from the delivery company 92 (process (5) in FIG. 7), converts the mail 925 to voice mail 926 using the text analyzing unit 53, extracts the society information 41 and additional information 42 in the information storing apparatus 4 (process (6) in FIG. 7), and transmits this information together to the system management apparatus 7 (process (7) in FIG. 7).

On receiving the information 41, the message 51, the additional information 42 and the voice mail 926, the system management apparatus 7 transmits this data to the writing unit 152 in the input/output apparatus 15 (process (7) in FIG. 7), and the writing unit 152 writes the information into the information storing unit 23 in the portable memory medium 2 (the same process (7) in FIG. 7).

The series of the above operations are performed during the period when the user 1 inserts the portable memory medium 2 into the input/output apparatus 15 and receives it again, similar to the second embodiment, and the information the user 1 wants is delivered at the time when the user 1 receives the portable memory medium 2.

In order to read the information, the user 1 inserts the portable memory medium 2 having various kinds of information into the information reading-out unit 86 in the portable information terminal 8 carried by the user (process (8) in FIG. 7), and by doing so, textual information within the delivered information is outputted from the information displaying unit 84 by voice (process (9) in FIG. 7).

The information contains photographs and figures and tables which cannot be converted into voice information. These are displayed on the information displaying unit 84 in synchronization with the voice output.

As described above, according to this embodiment, since the textual information is processed by textual analysis in the delivery side system, the textual information among the required information can be obtained in a form like listening to the radio, without requiring any complex processing in the portable information terminal 8.

Figure 8:
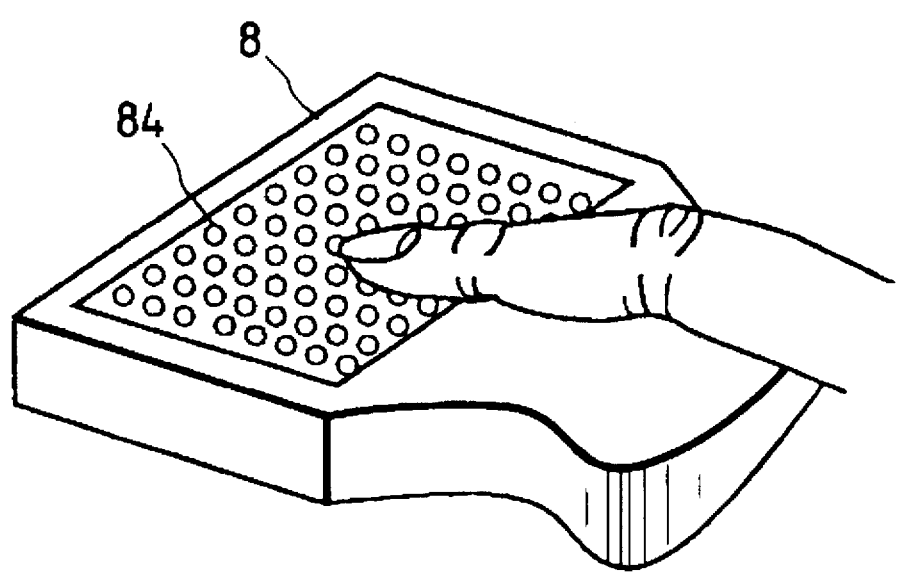
FIG. 8 is a detail view showing a portable information terminal capable of outputting braille as used in the third embodiment of an information delivery system in accordance with the present invention.

Although the portable information terminal 8 having a phonetic function is employed in this embodiment, it may be possible to realize a portable information terminal 8 which deals with only hiragana data, excluding syllable information, and which outputs braille, as shown in FIG. 8. By doing so, the portable information terminal becomes compact, since the display unit is unnecessary, though it becomes difficult to display figures or tables.

The textual analyzing means may be provided in the portable information terminal 8 if the portable information terminal 8 is able to accommodate the textual analysis. It is needless to say that such a structure does not deteriorate the advantage for the user 1.

Although, in the embodiment described above, the information stored on the delivery side of the information delivery system is composed of textual information data and additional information data for presenting the textual information to the user by voice or by braille, the information stored on the delivery side of the information delivery system may be phonetic information data stored in analog form or digital form in addition to the textual information data. In such a case, the textual analysis described above becomes unnecessary, and the voice information, as it is, is transmitted to the portable information terminal 8 like a radio broadcast to regenerate voice using a speaker or an earphone.

It should be obvious to the person skilled in the art that in the information delivery system of the first embodiment in which information is received over the air, by constructing the portable memory medium 2, the information storing apparatus 4, the information management apparatus 5 and the information displaying unit 84 in the same structure as in this embodiment, the textual information among the required information can be obtained also in the first embodiment in a form like listening to the radio.

[Supplements to the First, the Second and the Third Embodiments]

In the three embodiments described above, Examples of the flow of information between the newspaper publishing company 91 in the group of external information sources 9 and the upper information management apparatus 11, and between the upper information storing apparatus 10 and the upper information management apparatus 11, and between the upper information management apparatus and the information management apparatus 5 shown in FIG. 2 and FIG. 6 and FIG. 7 will be described below.

In the first place, the articles collected by the newspaper publishing company 91 are transmitted to the information management apparatus 912 though the information inputting apparatus 913 as the external information 915 by an operator 914, and the information management apparatus 912 stores the external information 915 in the information storing apparatus 911.

The various kinds of external information 915, stored in such a manner, are automatically transmitted to the upper information management apparatus 11 every time the operator 914 updates the information, and the upper information management apparatus 11 first stores the information in the upper information storing apparatus 10.

The external information 915 stored in the upper information storing apparatus 10 is converted into information which is easily deliverable to the user 1 at each of the railroad stations, for instance, course information combined in advance with fields and a keyword, such as the information data shown as an example for the contract data stored in the portable memory medium 2 described above. After this, the external information is transmitted from the upper information management apparatus 11 to the railroad station having the information management apparatus 5 as upper class information 101 to be stored in the information storing apparatus 4 and to be used for supplying various kinds of information to the user 1.

[Fourth Embodiment]

Although the present invention has been described with reference to the examples of systems in railroad stations in the first to third embodiments, the information delivery system according to the present invention can be utilized in a facility like a supermarket, as a system for supplying new service as to be described below.

Figure 9:
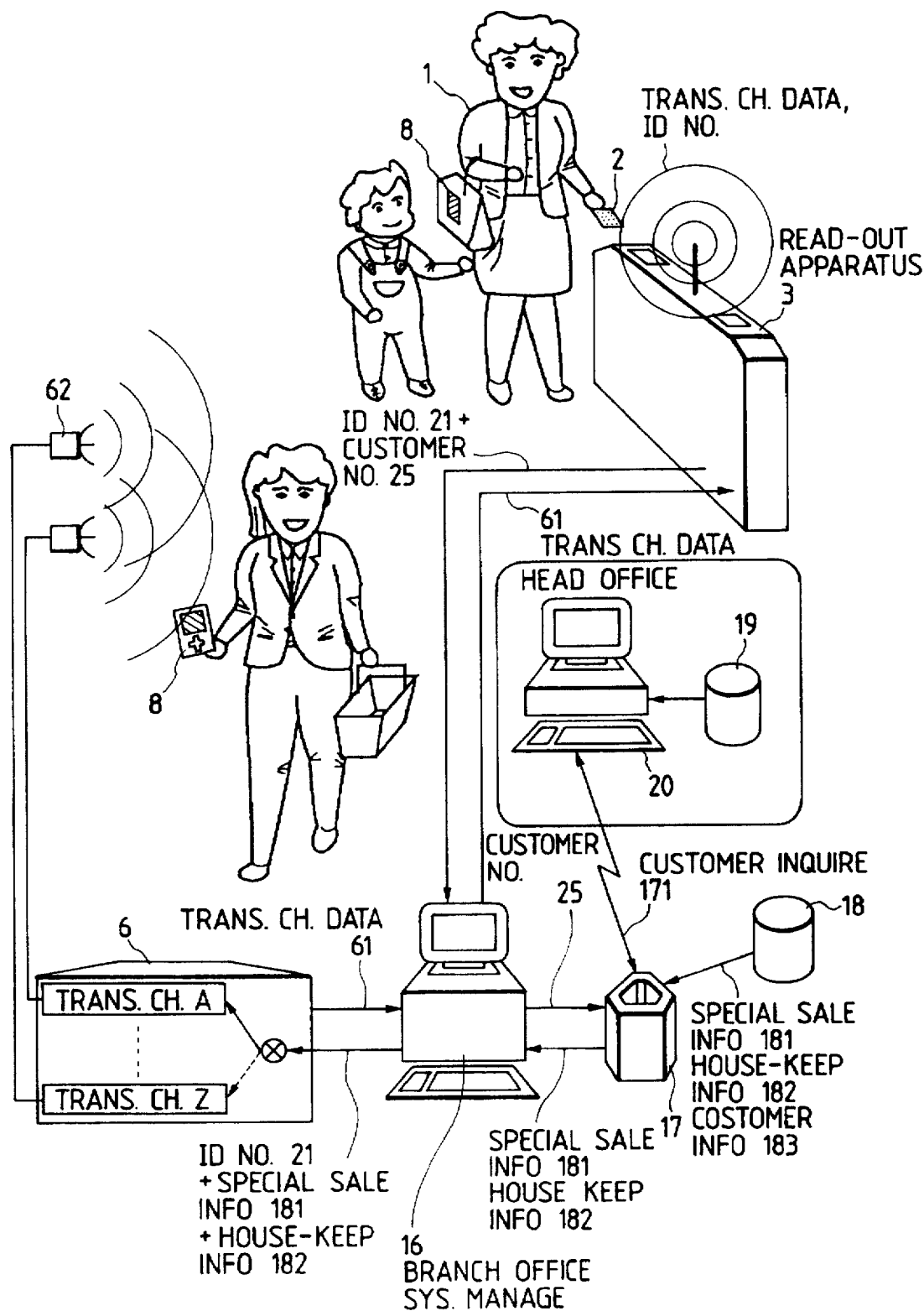
FIG. 9 is a diagrammatic view of a fourth embodiment of an information delivery system in accordance with the present invention.

FIG. 9 is a conceptual view showing an information delivery system according to a fourth embodiment of the present invention. This embodiment is a system for use in a supermarket.

In FIG. 9, the reference character 25 denotes a customer number stored in the portable memory medium 2 which is assigned to each customer. The reference character 18 denotes a branch office information storing apparatus which stores information for customers of the branch office of the supermarket and customer numbers 25. A branch office information management apparatus 17 extracts the information stored in the branch office information storing apparatus 18 based on the customer number 25. A branch office system management apparatus 16 performs data management among the reading-out apparatus 3, the branch office information management apparatus 17 and the transmission management apparatus 6. A head office information storing apparatus 19 stores the customer information 183 of each of the branch offices, and a head office system management apparatus 20 processes an inquiry in regard to the customer from the branch office information management apparatus 17 in each of the branch offices. The reference character 181 denotes special sale information, while the reference character 182 denotes house keeping information on new products, menus, and health methods. The reference character 183 denotes customer information, such as a number in regard to a customer and items of shopping selected by the customer when the customer came to the supermarket the last time, and the reference character 171 denotes a customer inquiry for customer information 183 to the head office when the customer information 183 corresponding to the customer number 25 is not stored in the branch information storing apparatus 18.

The parts not described above are the same as those in the first embodiment shown in FIG. 1.

Figure 10:
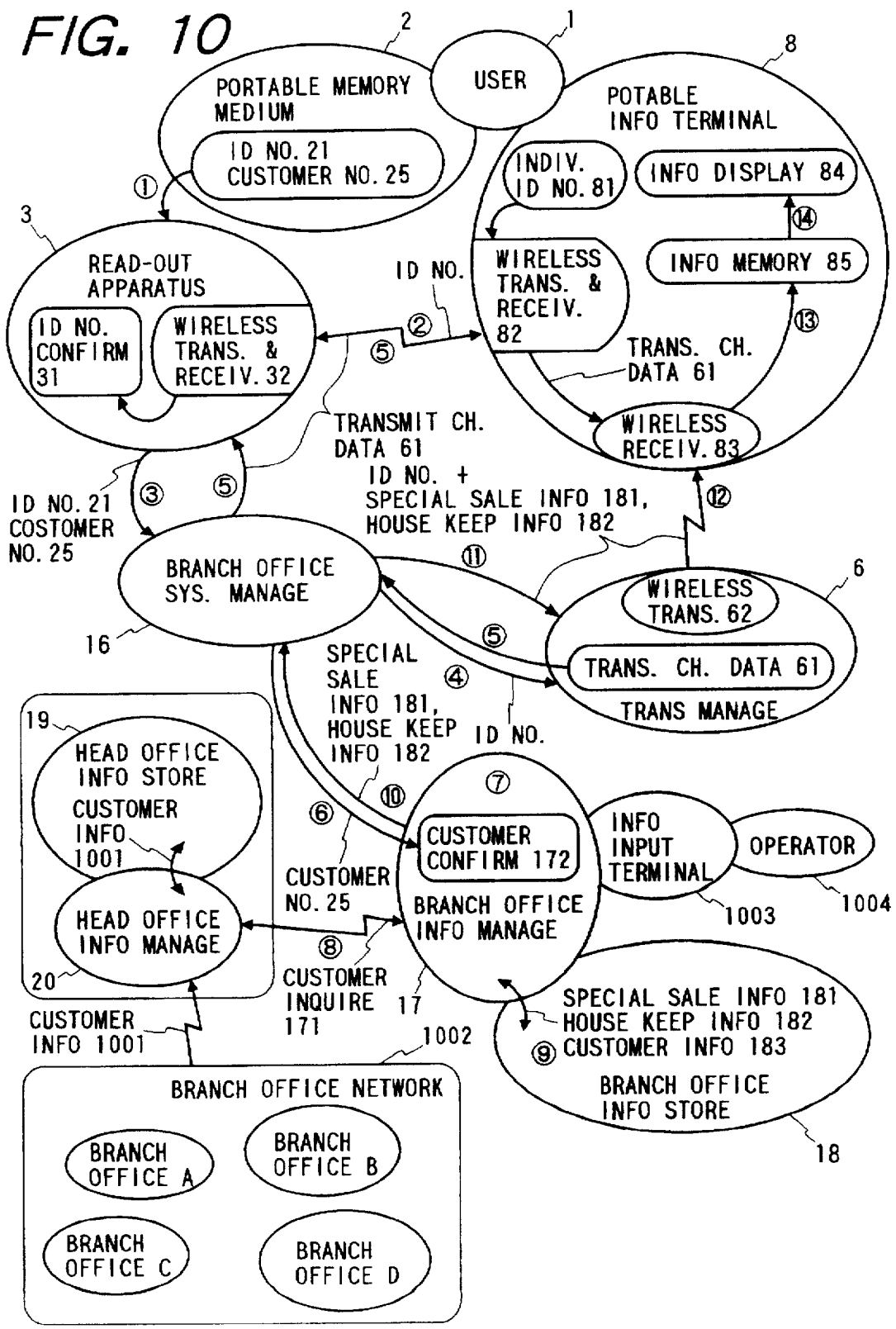
FIG. 10 is an explanatory diagram showing the construction and the data flow of the fourth embodiment of an information delivery system in accordance with the present invention.

FIG. 10 shows how the information or the other data is processed in the system of the fourth embodiment having construction shown in FIG. 9.

In FIG. 10, a customer confirming unit 172 operates to check the customer number 25 and the customer information 183 in the branch office information storing apparatus 18. The reference character 1002 denotes a branch office network for the supermarket, and the reference character 1003 denotes an information input terminal which is used for inputting special sale information 181, the house keeping information 182 or information on a new customer in the branch office information storing apparatus 18 in each branch office. The reference character 1004 denotes an operator for operating the information inputting terminal 1003.

In this embodiment, the system is assumed to be used in a supermarket where the user 1 often goes shopping. The operation of the embodiment will be described below, referring to FIG. 9 and FIG. 10.

Initially, the user 1 inserts the portable memory medium 2, which stores the identification number 21 and the customer number 25, into the reading-out apparatus 3 installed at an entrance of the store.

Then, the reading-out apparatus 3 reads out the identification number 21 and the customer number 25 (process (1) in FIG. 10), and transmits this information to the branch office system management apparatus 16 to perform the processes up to the process for setting the transmitting channel data 61 to the wireless receiving unit 83 in the portable information terminal 8, similar to the first embodiment described above, that is, up to the process where the portable information terminal 8 is in a state of completion of preparation for receiving information (processes (2), (3), (4), (5) in FIG. 10).

As the preparation of the portable information terminal 8 for receiving information is completed, the branch office system management apparatus 16 transmits the customer number 25 to the branch office information management apparatus 17 (process (6) in FIG. 10).

On receiving the customer number 25, the customer confirming unit 172 in the branch office information management apparatus 17 extracts the customer information from the branch office information storing apparatus 18 based on the customer number to check whether the customer just coming in is a customer of the branch office (process (7) in FIG. 10).

If the customer usually uses another branch office and comes to this branch office today by chance, the customer information 183 corresponding to the customer number 25 possibly will not be found. In such a case, the branch office information management apparatus 17 sends a customer inquiry 171 to the head office information management apparatus 20 to obtain the customer information 1001 from the head office (process (8) in FIG. 10).

After confirming whether the user is a customer, the branch office information management apparatus 17 reads out the special sale information 181 and the house keeping information 182 from the branch office information storing apparatus 18 (process (9) in FIG. 10), and transmits this information together with the customer information 183 to the branch office management apparatus 16 (process (10) in FIG.

After that, the information with the identification number 21 is transmitted to the portable information terminal 8 of the customer in the store from the wireless transmitting unit 62 in the transmission management apparatus 6 in the same way as in the first embodiment described above (processes (11), (12) in FIG. 10).

On the other hand, the portable information terminal 8 carried by the user 1 receives various kinds of information transmitted from the wireless transmitting unit 62 via the wireless receiving unit 83 in referring to the identification number in the same way as in the first embodiment, and sequentially stores the received information in the information storing unit 85 (process (13) in FIG. 10).

In the final stage, the information stored in the information storing unit 85 is displayed by operation of the user 1 to show the information supplied to the customer by the supermarket, that is, the special sale information 181, the customer information 183, such as a shopping list of items selected the last time, and the house keeping information 182, such as a recommendation of a menu (process (14) in FIG. 10).

As described above, according to this embodiment, by merely passing the customer card (portable memory medium 2) through the reading-out apparatus 3, the customer can get various kinds of information useful for shopping, and the supermarket can increase the number of its customers through a better understanding of customer needs and by supplying various kinds of information services to regular customers.

Since the various kinds of service information is different depending on each branch office, an information input terminal 1003 is provided in each branch office through which the operator 1004 registers new customers and inputs special sale information today, living information and so on, so as to store this information in the branch office information storing apparatus 18 in advance.

After the opening hour of the store, the branch office information storing apparatus 18 is updated by transmitting the new customer information to the head office and by calling up the shopping list of a customer who shopped at another branch office only today from the head office.

Updating the shopping contents of a user 1 indicated by the customer information 183 can be easily performed by passing the portable memory medium 2, which stores the customer number 25 through a register at the time of payment and using the customer number 25 to key in new information, which is not shown in the figure.

Although the main functions in this embodiment follow those of the first embodiment of FIG. 1 and FIG. 2, it should be obvious to the person skilled in the art that the exchange of the identification number and the customer number at the entrance of the store may be performed using the portable memory medium or the portable information terminal shown in FIG. 4 or FIG. 5, or the supply of information may be performed through the portable information terminal as shown in the second embodiment or may be made to correspond to the portable information terminal capable of providing information by voice or braille, as shown in the third embodiment.

[Supplements to the First to the Fourth Embodiments]

According to the information delivery system of the present invention, as described in the first to fourth embodiments, the user can easily look at his required or desired information on the portable information terminal on hand without any menu selection in order to obtain the information; and further, when the system is applied to a facility requiring entrance tickets, there is no need to pay special attention to the users to get information, since the action of entering itself becomes the action of getting information.

In the first to the fourth embodiments, the shape of the portable memory medium 2 is preferably a cashing-card type device, and the memory means incorporated therein is preferably small in size and high in anti-shock property, such as a magnetic memory, a semiconductor memory or an opto-magnetic memory; and further, this portable memory medium is preferably capable of storing a massive amount of data, especially in the second and the third embodiments.

Figure 11:
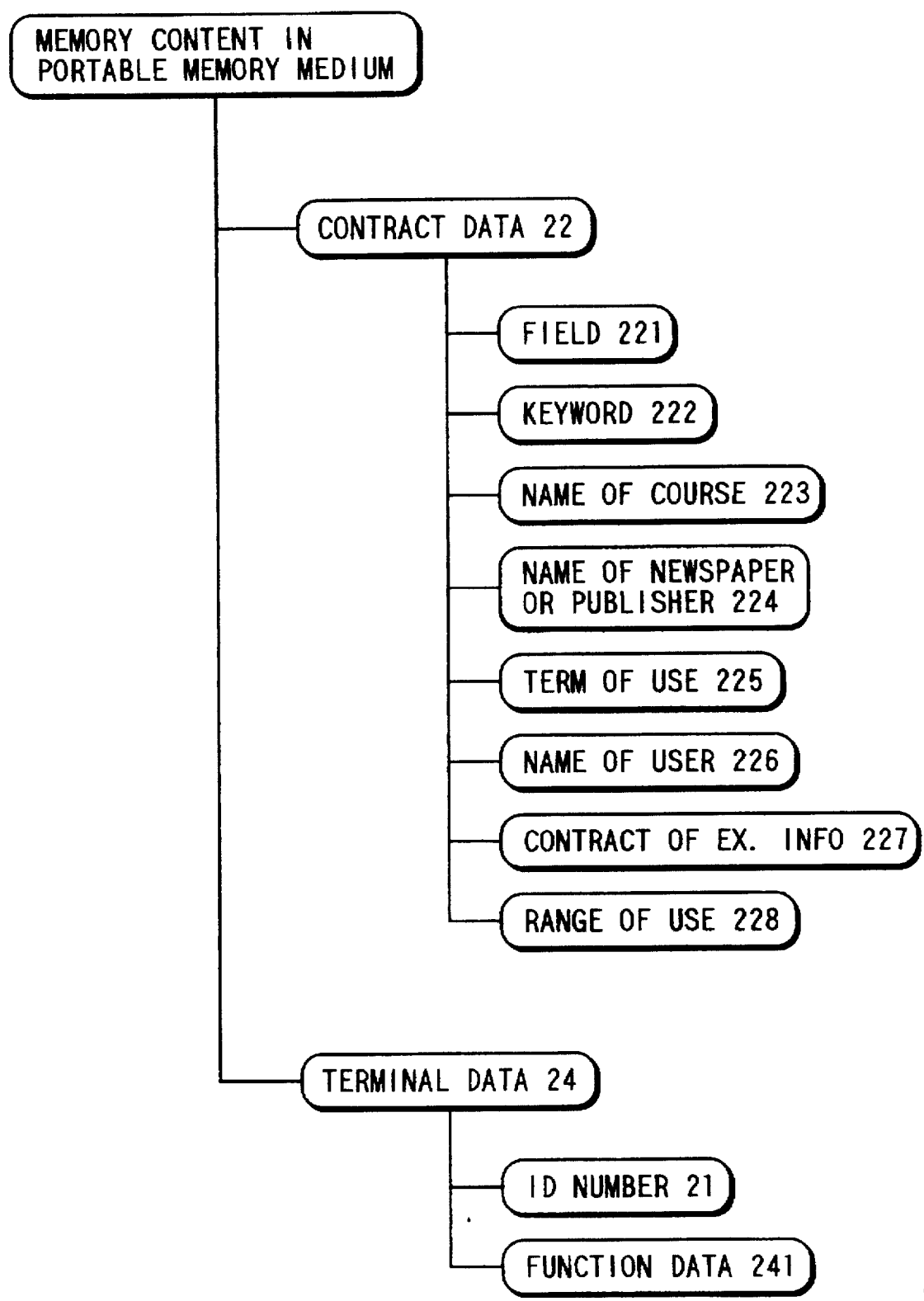
FIG. 11 is a chart showing an example of the contents stored in a portable memory medium in each of the embodiments in accordance with the present invention.

In order to realize the information delivery system in the first to third embodiments, the contents stored in the portable memory medium 2 are mainly the data relating to the contract and the data relating to the portable information terminal 8, as shown in FIG. 11.

Firstly, in the contract data 22, the field 221 is an item expressing a name to classify information commonly used in, for example, a newspaper, such as information relating to society, the economy, sports, entertainment and the like, the key word 222 is an item expressing a detailed title name of information, such as a money exchange rate, a stock market quotation and the like, the course name 223 is an item expressing a name of a piece of course information which is formed in advance on the delivery side of the system by combining plural fields or plural key words, the name of newspaper publishing company or book publishing company 224 is an item expressing a name of an information company as an information supply source, the term of use 225 is an item expressing the term of a contract in which a user can obtain information on each field, each course or each item of the information, the name of user 226 is an item expressing a name of the possessor of the portable memory medium 2 and the portable information terminal 8, the contract of external information 227 is an item expressing presence or absence of a contract between an external information storing system and the name of the storing system and the term of use, and the range of use 228 is an item expressing a section of the user's commuting where the user receives information.

Secondly, as to the terminal data 24, the identification number 21 is an item expressing an individual number assigned to the portable information terminal 8 corresponding to the portable memory medium 2, as described in the first embodiment above, and the function data 241 is an item expressing the presence or absence of a function of display in braille or output in a voice mode.

In a case where the portable memory medium also serves as a commuter pass for a train, for example, as shown in the first embodiment, a clerk at a ticket office may input the contract data 22 and the terminal data 24 into the portable memory medium 2 on behalf of the information supplier (newspaper publisher or the like), that is, information concerning receiving of the application of a user, calculating of a service fee according to the contents of a requested delivery, and writing in the various data mentioned above. By doing so, since the contract or the renewal thereof for information delivery can be performed together with a necessary procedure of every day life for the user, such as buying a commuter pass; and hence, since the procedure is not for only the purpose of obtaining information, it is very convenient for the user.

The information data is compressed in the first to the fourth embodiments though it is not described in detail above. Therefore, if a function to decompress the compressed data is provided in the portable information terminal 8, the information storing apparatus and the information storing unit can store more information and at the same time the time required for delivery can be shortened.

In addition to the facilities described in the first to the fourth embodiments, the following facilities for the information delivery system according to the present invention can be adopted. For a movie theater or a drama theater, the personal histories of the actors and the actresses can be delivered to the portable information terminal 8 by reading out to an entrance ticket, depending on the contents of the entrance ticket. For an airport, new information in regard to a passenger's destination or a weather report of the destination can be delivered by reading out to the boarding pass of the passenger. For a museum, a zoo or an art gallery, notice of a special exhibition and the like can be delivered by reading out to an entrance ticket. Further, various other applications can be devised, for example, by using the system according to the present invention at a railroad station when a user gets off a train rather than getting on, such as providing guidance in the vicinity of the railroad station and information in regard to a special event on that day, similar to the case of the boarding pass described above.

[Examples of the Portable Information Terminal]

Examples of the portable information terminal 8 used in the information delivery system according to the present invention will be described below, referring to the drawings.

Figure 12:
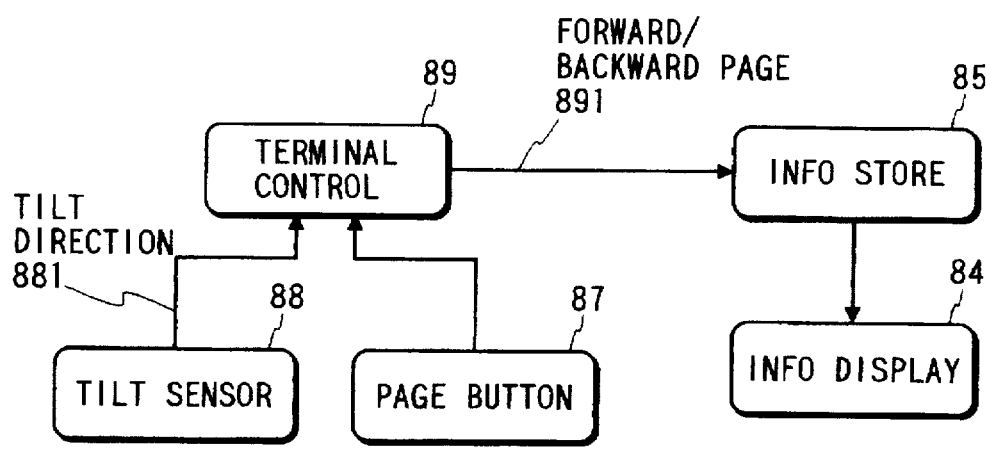
FIG. 12 is a block diagram of a portable information terminal in accordance with the present invention.

FIG. 12 is a block diagram of a portable information terminal in accordance with the present invention.

In FIG. 12, the portable information terminal 8 includes an information storing unit 85 for storing information having a volume of plural pages, an information display unit 84 for displaying data output from the information storing unit 85, a paging button 87 for paging in the direction of tilting of the portable information terminal 8 only while the button is being pushed for the purpose of preventing an error in operation, a tilt detecting sensor 88 for detecting the direction of tilting of the portable information terminal 8 and for supplying a signal 881 indicating the direction of tilting as the output of the tilt detecting sensor, and a terminal control unit 89 for controlling switching of a page being read out from the information storing unit 85 by confirming the states of the paging button 87 and the tilt detecting sensor 88. The reference character 891 denotes signal indicating a forward/backward page (forward page/backward page instruction) for instructing which direction the page now is paged, forward or backward, to the information display unit 84.

The paging button 87 is provided in a position where it is easily accessible (for example, a position where a forefinger or the thumb of an operator reaches) when the portable information terminal 8 is held with one hand.

Figure 13:
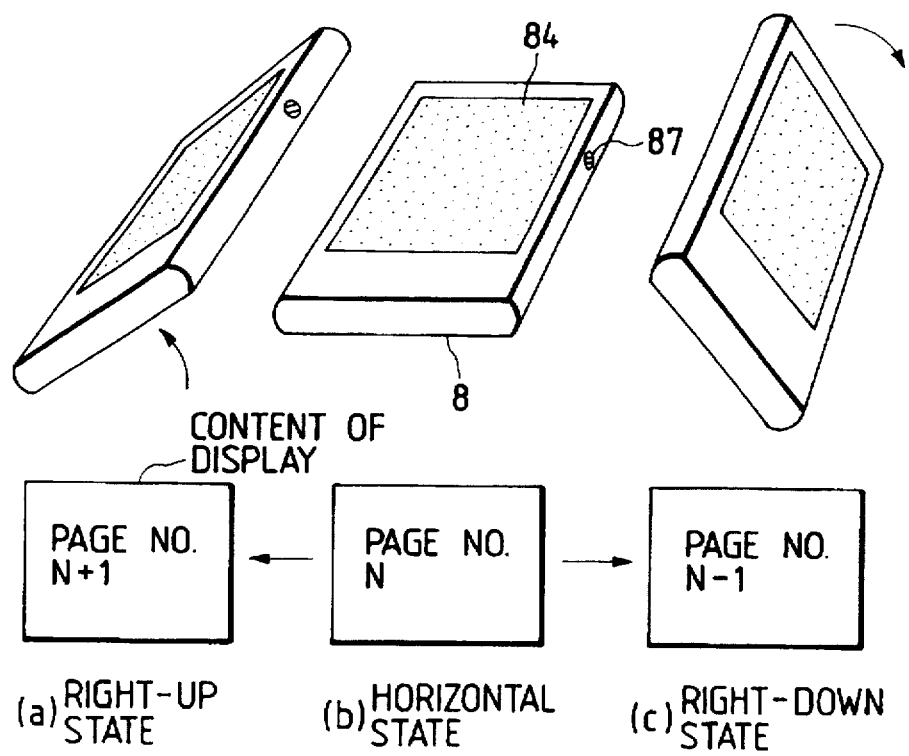
FIG. 13 is a diagrammatic view showing an example of the relationship between the tilt of a portable information terminal and the operation of paging in accordance with the present invention.

FIG. 13 is a view showing an example in which the portable information terminal 8 is tilted to right-up and right-down states from a horizontal state. It is assumed here that the operation is such that paging is performed backward when the portable information terminal is in the right-down state and forward when it is in the right-up state.

This example will be described below, referring to FIG. 12 and FIG. 13.

It is assumed that the user of the portable information terminal 8 is currently reading the page N of a display stored in the information storing unit 85 (FIG. 13 (b)), and that, after completion of reading this page, the user wants to switch the display to the next page (N+1).

To accomplish this, the user tilts the portable information terminal 8 to the right-up state while the page button 87 is being pushed (FIG. 13 (a)).

Then, the tilt detecting sensor 88 contained inside the portable information terminal 8 is operated and a signal indicating that the terminal 8 is now tilted in the right-up state, that is, the signal 881 indicating the direction of tilting, is input into the terminal control unit 89 from the tilt detecting sensor 88.

On receiving both of the signal 881 indicating the direction of tilting and the signal indicating that the page button 87 is being pushed, the terminal control unit 89 judges that the user wants to page, and inputs the signal 891 for forward/backward paging to the information storing unit 85 for paging to the page N+1 stored in the information storing unit 85 and displaying the new page on the information displaying unit 84, since the portable information terminal is now tilted in the right-up state.

In the case of paging backward, on the other hand, the user tilts the portable information terminal 8 to the right-down state, while the page button 87 is being pushed (FIG. 13 (c)).

As described above, according to the invention, paging can be easily performed by holding the portable information terminal 8 with one hand. Thus, when using such a portable information terminal 18, for example, in the information delivery system of the first to the fourth embodiments, the received information can be seen easily while being held with one hand in a crowded train or when the other hand is occupied with a package during shopping.

Although the page button 87 is used for prevention of error operation in this example, a touch sensor utilizing the conductivity of the human body may be used instead.

Figure 14:
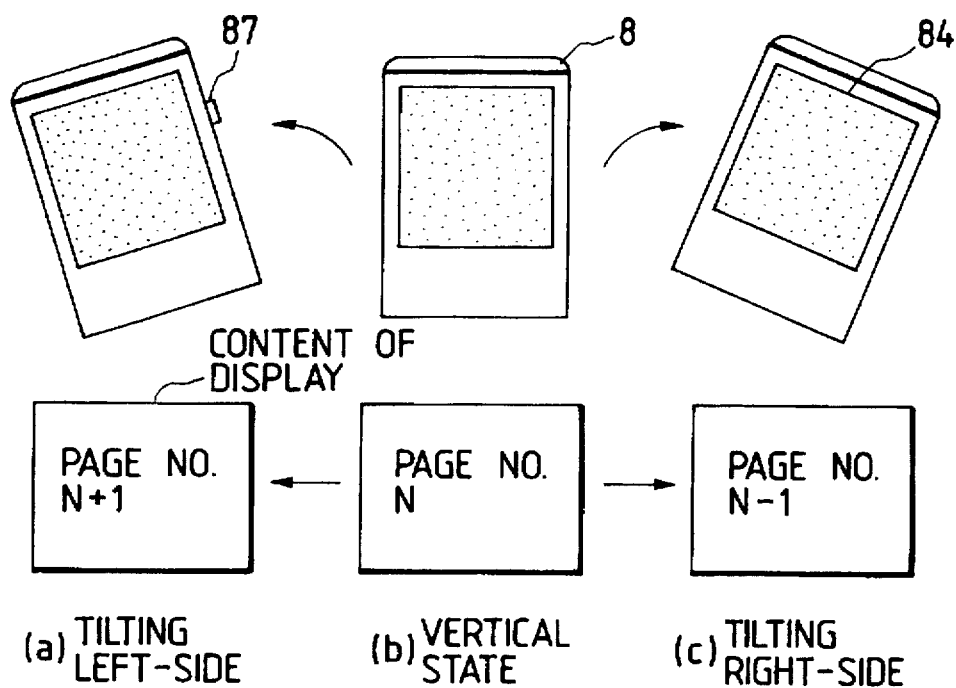
FIG. 14 is a diagrammatic view showing another example of the relationship between the tilt of a portable information terminal and the operation of paging in accordance with the present invention.

Further, although the tilting of the portable information terminal 8 from a horizontal state is used for controlling paging in this example, tilting from a vertical state toward the left or right direction may be used. For example, in an example seen in of FIG. 14, the display is paged forward when the portable information terminal is tilted toward the left while the page button is being pushed, and is paged backward when tilted toward the right.

Furthermore, the velocity of tilting or the acceleration of tilting of the portable information terminal 8 may be used for detecting the operation of paging rather than the tilting of the portable information terminal. By doing so, it is possible to improve the operability of paging by strongly shaking the terminal. In this way, when the tilt detecting sensor 88 outputs the tilt angle of the portable information terminal 8, the velocity can be obtained by differentiating the tilt angle with time.

Figure 15:
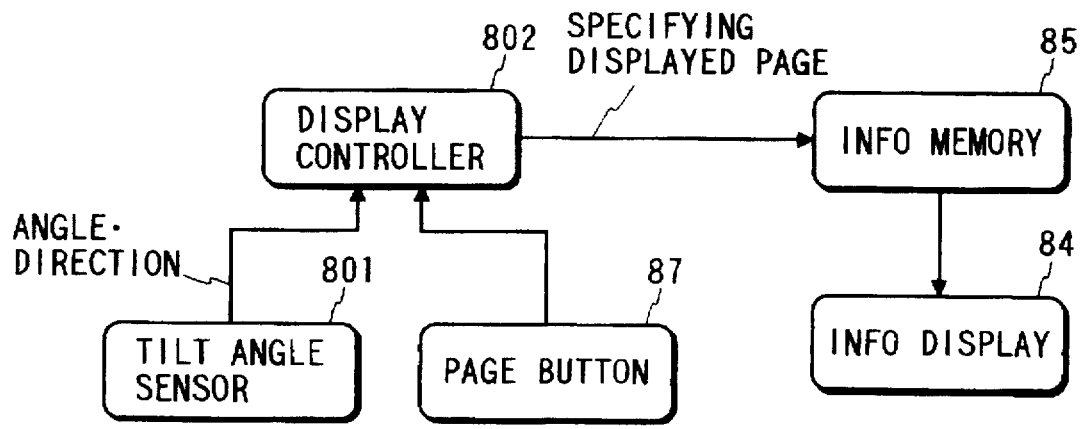
FIG. 15 is a block diagram of a portable information terminal in accordance with the present invention.

FIG. 15 is a block diagram of another embodiment of a portable information terminal in accordance with the present invention.

The different point of this example from that of FIG. 12 is that the performance of paging changes depending on the degree of tilting of the portable information terminal 8.

In FIG. 15, a tilt angle detecting sensor 801 operates to detect the tilt angle and the direction of tilting of the portable information terminal 8, and a display control unit 802 controls switching of the page read from the information storing unit 85 depending on the degree of tilting output from the tilt angle detecting sensor 801 to change the velocity of paging or the number of pages per one paging operation. The other blocks are the same as those of FIG. 12.

Figure 16:
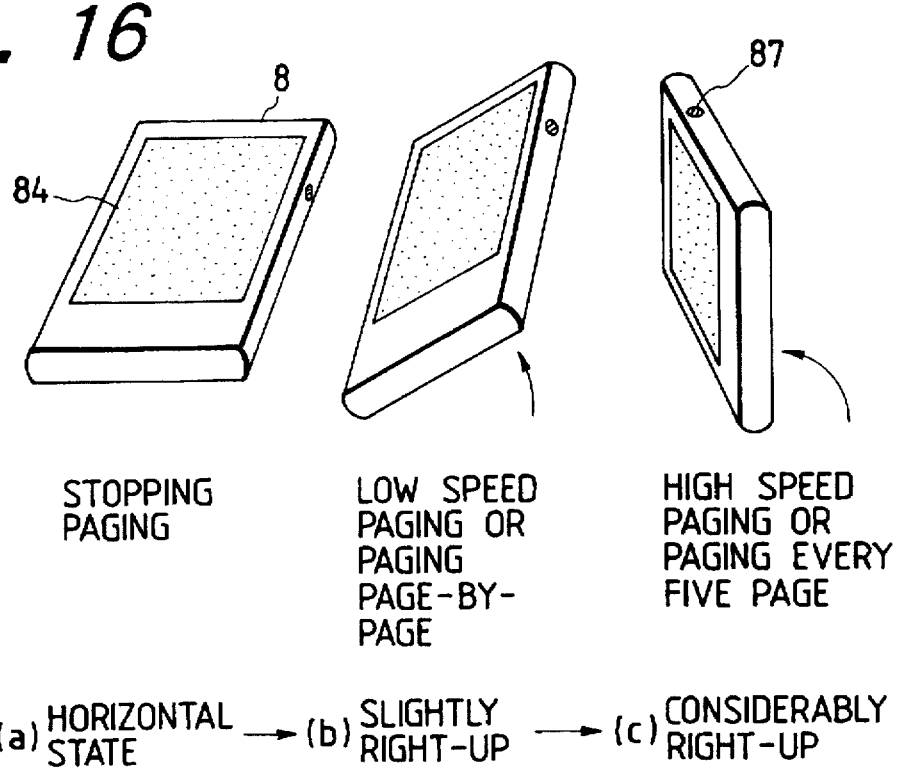
FIG. 16 is a diagrammatic view showing an example of the relationship between the degree of tilt of a portable

FIG. 16 is a supplementary view showing an example of the relationship between the degree of tilt of a portable information terminal and the operation of paging. Herein, the speed of paging becomes higher or the number of skipped pages becomes larger as the degree of tilting becomes larger.

The operation of this embodiment will be described, referring to FIG. 15 and FIG. 16.

It is assumed that the user of the portable information terminal 8 is currently reading a certain page while keeping the portable information terminal 8 horizontal (FIG. 16 (a)), and after completion of reading, the user tilts the portable information terminal 8 to the right-up state while the page button 87 is being pushed (FIG. 16 (b)) in order to page up to a certain page the user wants to read.

As a result, the tilt angle detecting sensor 801 detects that the portable information terminal 8 is slightly tilted in a right-up state, and a signal is input to the display control unit 802. However, since the tilt angle is not so large now, the display control unit 802 outputs to the information storing unit 85 a page switching signal by which paging is controlled continuously, but slowly, or is performed only one page at a time.

It is now assumed that the user tilts the portable information terminal 8 more than halfway from horizontal, since the user thinks the objective page is further forward (FIG. 16 (c)).

As a result, the tilt angle detecting sensor 801 detects that the portable information terminal 8 is tilted through a large angle in a right-up state, and the signal is input to the display control unit 802. The display control unit 802 outputs to the information storing unit 85 a page switching signal by which paging is controlled continuously and rapidly, or is performed so as to effect skipping of plural pages (skipping five pages in the embodiment of FIG. 16) so as to reach the objective page more quickly.

As described above, according to this example, it is possible to easily page and quickly switch the display to a desired page even if the portable information terminal 8 is held by one hand.

Figure 17:
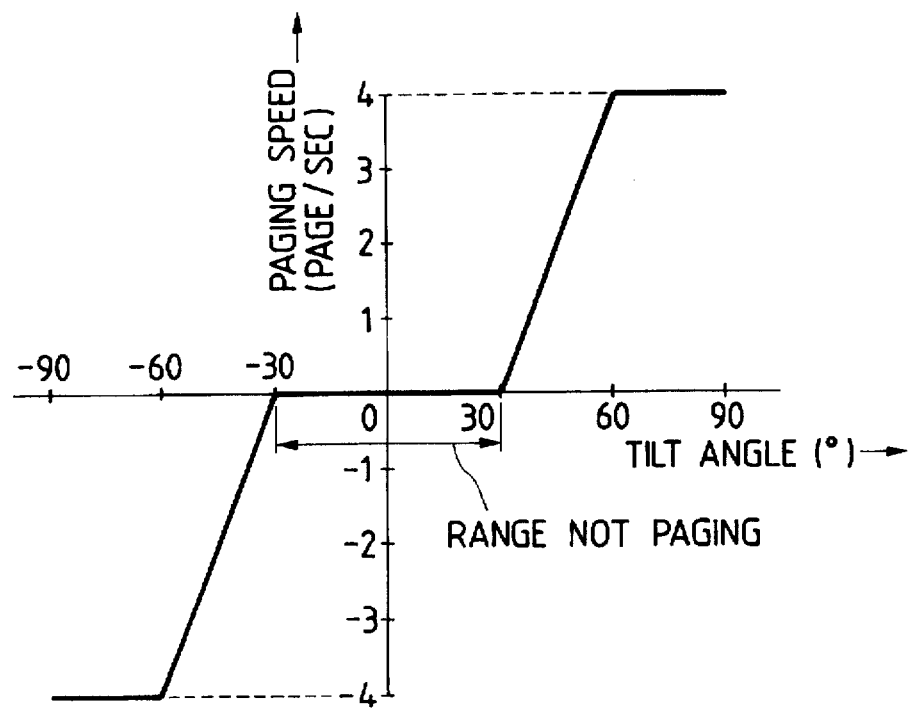
FIG. 17 is a graph showing an example of the relationship between the tilting angle of a portable information terminal and the speed of paging in accordance with the present invention.

FIG. 17 is a graph showing an example of the speed of paging versus the output of the tilt angle detecting sensor 802 described above. In the figure, it is shown that the speed of paging is 0 page/second when the tilt angle is less than ±30°, the speed of paging is ±4 pages/second when the tilt angle is larger than ±60°, and the speed of paging is ±1 to 3 pages/second when the tilt angle is in the range of ±30° to 60°.

Incidentally, by preventing paging when the tilting angle is less than a certain angle (30° in the figure) as in the example of FIG. 17, the portable information terminal 8 can be dealt with somewhat roughly while the page button 87 is being pushed or in a case where the portable information terminal 8 does not have a page button 87 for preventing operation error, which also improves the convenience of using the portable information terminal.

Figure 18:
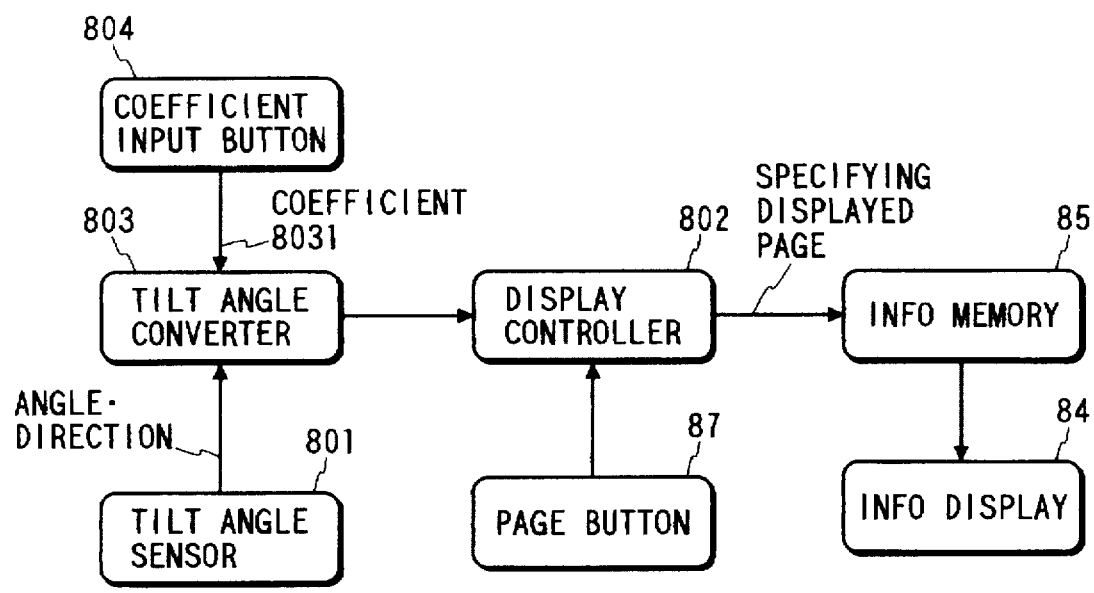
FIG. 18 is a block diagram of a portable information terminal in accordance with the present invention.

FIG. 18 is a block diagram of another example of a portable information terminal in accordance with the present invention. The difference in this example from the example of FIG. 15 is that the user can set the speed of paging or the number of skipped pages in accordance with the degree of tilting.

In FIG. 18, a tilt angle converting unit 803 converts the output of a tilt angle detecting sensor 801 using a coefficient 8031 stored inside, and a coefficient input button 804 is used for inputting the coefficient 8031 stored inside the tilt angle converting unit 803 by the user. The other blocks are the same as those in FIG. 15.

Figure 19:
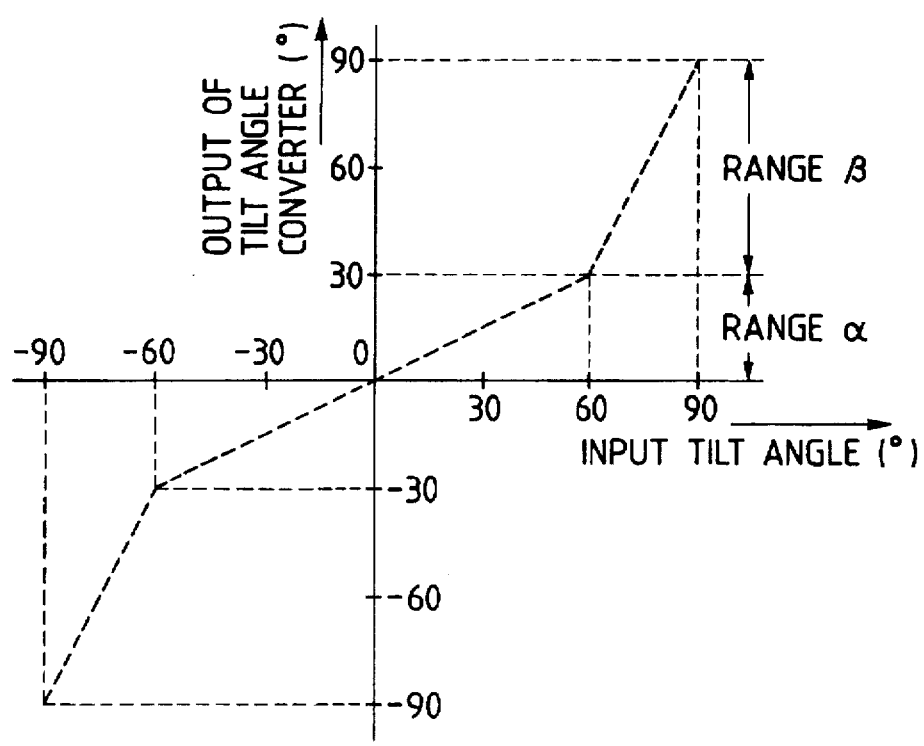
FIG. 19 is a graph showing an example of the relationship between input and output of a tilting angle converting unit in the portable information terminal of FIG. 18 in accordance with the present invention.

FIG. 19 is a graph showing an example of the relationship between input and output of the tilting angle converting unit. In the embodiment shown in FIG. 19, the input to the tilt angle converting unit 803 is divided into an a range and a p range, as follows:

[α range; |α|≦60°]

$$\alpha(out) = \alpha(in) \times \text{first coefficient} \quad (1)$$

[β range; |β|>60°]

$$\beta(out) = (\beta(in) - 60) \times \text{second coefficient} \quad (2)$$

where the first coefficient=½, and the second coefficient=2.

The input tilt angle is converted using the equation (1) and the equation (2) above.

The operation for the tilt angle of the display controlling unit 802 in the example receiving the output from the tilt angle converting unit 803 is similar to that of FIG. 17 described above.

The operation of this example will be described, referring to FIG. 18, FIG. 19 and FIG. 17.

In this example, initially a user inputs the coefficient 8031 through the coefficient input button 804 to set the coefficient to the tilt angle converting unit 803. As to the method of inputting, a value may be input, or a value may be selected from some number of preset values in the portable information terminal 8.

As a tilt angle value from the tilt angle detecting sensor 801 is input to the tilt angle converting unit 803, the tilt angle converting unit 803 converts the input tilt angle using a preset coefficient, for example, using the equations (1) and (2), as shown in FIG. 19, and the result is input to the display control unit 802.

The display control unit 802 operates in the same manner as the example of FIG. 15 using a converted tilt angle. With conversion shown in FIG. 19, it can be understood that paging is not performed when the tilting of the portable information terminal 8 is less than ±60°, and the speed of paging varies 1 to 4 pages/second when the tilt angle of the portable information terminal 8 is in the range above ±60° and up to ±90°. As a result, the paging is initiated at a tilt angle which is larger than the angle in the example of FIG. 15.

As described above, in this example, the user can adjust the tilt angle and the manner of paging corresponding to the tilt angle so that the user may easily operate the terminal, and therefore the operability is further improved.

Figure 20:
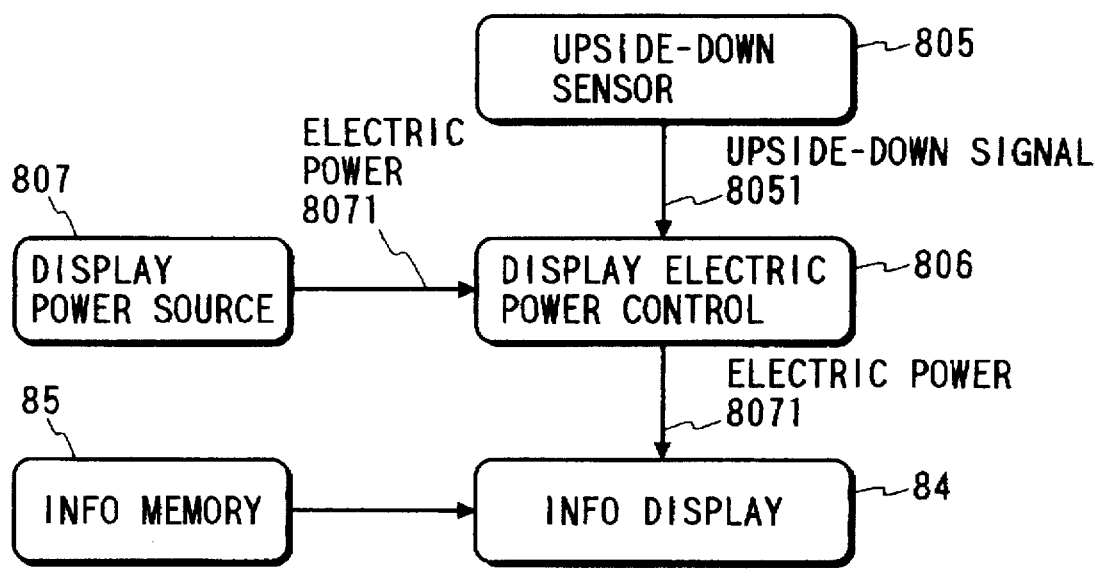
FIG. 20 is a block diagram of a portable information terminal in accordance with the present invention.

FIG. 20 is a block diagram of a further example of a portable information terminal in accordance with the present invention. In FIG. 20, an upside-down detecting sensor 805 is provided for detecting an upside-down state or a display-side down state of the portable information terminal 8, and a display power source controlling unit 806 operates to cut off the electric power supplied to the circuit block of the display system depending on the presence or absence of the output from the upside-down detecting sensor 805. The reference character 8051 denotes an upside-down signal. A display power source 807 supplies electric power 8071 to each of the blocks relating to the display in the portable information terminal 8. The other blocks are the same as blocks in FIG. 12.

The operation of this example will be described, with reference to FIG. 20 and FIG. 21.

Figure 21:
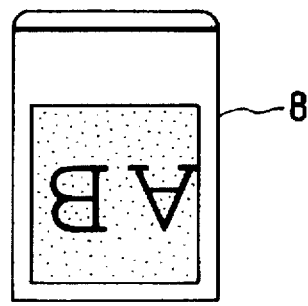
FIG. 21 is a diagrammatic view showing an upside-down state of a portable information terminal in accordance with the present invention.

As a user finishes using the portable information terminal 8 and the portable information terminal 8 is turned upside-down, as shown in FIG. 21, in order to put the portable information terminal 8 into a bag or a pocket, the upside-down detecting sensor 805 operates to output the upside-down signal 8051 to the display power source controlling unit 806, and the display power source controlling unit 806 cuts off the electric power 8071 supplied to the information display unit 84 from the display power source 807 to shut off the display.

The portable information terminal 8, the operation of the display system of which has been stopped by the upside-down state, is restarted to again display information by taking it out and setting the portable information terminal in an up-right state.

As described above, the user can stop only operation of the display system of the portable information terminal 8 and keep the other blocks in operation without any inconvenience.

In a case where the portable information terminal 8 employs a wireless system as a means for receiving information from the outside, since the blocks other than the display system are in operation, the portable information terminal 8 can receive information even if it is in a bag or in a pocket. Further, in the case of a display system with a back light, the power consumption can be decreased by stopping operation of the back light, and accordingly the operation time of the portable information terminal 8 can be lengthened.

Therefore, by combining this feature with the information delivery system of the first embodiment or the fourth embodiment, the user can be provided with a simplified handling system.

According to the embodiments described above, by storing the various kinds of information to be delivered in the portable memory medium or the portable information terminal carried by a user, information is delivered to the user depending on the contents of the memory read out by the reading-out apparatus. Therefore, for a user whose requesting information to be delivered is determined, the user can obtain the information without any action except inserting the portable memory medium into the reading-out apparatus or passing through the portable memory medium or the portable information terminal beside the reading-out apparatus.

Further, if an automatically checked commuter pass is utilized as the portable memory medium, the user can obtain information without any conscious action to obtain the information, since the action of passing the memory medium through the reading-out apparatus is basically the same as for checking a ticket. In addition to this, if the user periodically uses the ticket checking, it is very convenient for the user to periodically collect information at the same time.

Furthermore, since the portable information terminal which is to receive the information is confirmed in advance by checking the identification number of the portable memory medium and the identification number of the portable information terminal, there is no possibility that the information is transmitted to a wrong portable information terminal even if the portable information terminal is reconfirmed at every transmission of information.

Still further, since the portable information terminal is put in a stand-by state at an entrance of a specified area by supplying data identifying an assigned transmitting channel to the portable information terminal, the waiting time for transmitting the information can be shortened and accordingly the time of delivering the information to the portable information terminal can be reduced.

Further, since a message information indicating expiration of the term of the contract or the near expiration of the term of the contract can be sent to the user, the user can be notified of the expiration of the contract and can renew the contract.

Still further, since textual information can be transmitted to the user in voice or in braille, a handicapped person can use the information. In a case of using voice, a non-handicapped person can obtain information in the same manner as listening to the radio, which improves the usability.

Still further, since private information can be delivered in addition to mass media information, the usability for the user can be improved.

Further, since information may be delivered only inside a specified area, the management of the system can be easily performed.

Furthermore, since paging can be controlled simply by tilting the portable information terminal, paging can be carried out using one hand to improve the operability.

Further, since paging can be controlled corresponding to the degree of tilting of the portable information terminal by the user, an inadvertent tilting of the portable information terminal does not cause paging and accordingly the operability is improved.

Still further, since the display function is automatically stopped by detecting that the portable information terminal is in a state where the display of the terminal is not being used, the consumption of power can be decreased.

[Fifth Embodiment]

FIG. 22 to FIG. 25 show a further embodiment in accordance with the present invention. FIG. 26 shows a modification of the transmitted data. The embodiment has an information transmitting function for selectively acquiring required data with reference to a sorting code by receiving transmitted data transmitted without specifying information terminals to a plurality of portable information terminals from a broadcasting transmitting means which adds the information sorting code, in addition to the information transmitting function for receiving transmitted data transmitted to a specified portable information terminal from a wireless transmitting unit using said specified portable information terminal as described above.

Figure 22:
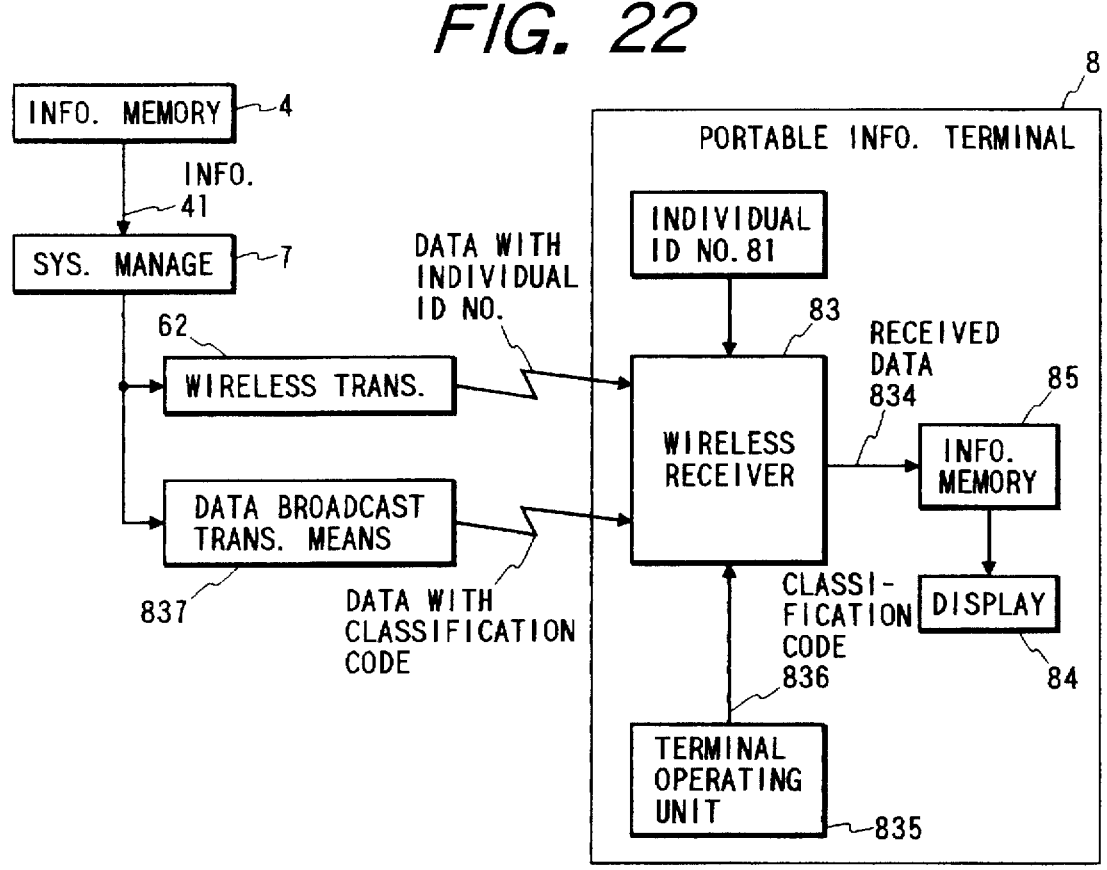
FIG. 22 is a block diagram showing a fifth embodiment of an information delivery system in accordance with the present invention.

In FIG. 22, a data broadcasting transmitting means 837 is connected to a system management apparatus 7, and operates to add a sorting code corresponding to the contents of information 41 to the information 41, acquired from an information storing apparatus 4 through the system management apparatus 7, and to transmit the information over the air. FIG. 25 shows a data format for the data transmitted by the data broadcasting transmitting means 873. The sorting code 836 is added in front of the information 41 acquired from the information storing apparatus 4. The wireless transmitting unit 62, on the other hand, transmits the information 41 over the air along with an individual identification number 81 for specifying a portable information terminal in a format as shown in FIG. 24.

The portable information terminal 8 is constructed so as to be capable of receiving and storing the transmitted data, including the information from the wireless transmitting unit 62 to which the individual identification number 81 is added and the information from the data broadcast transmitting means 837 to which the specified sorting code 836 is added. A terminal operating unit 835 is an input operating means for specifying the information sorting code 836 required to be acquired, and selectively specifies the sorting code from a table of sorting codes displayed on an information display unit 84 or inputs the sorting code to a wireless receiving unit 83. The sorting code 836 can be set by utilizing the field 221, key word 222, the name of a course 223 and so on, shown as an example of the contents of contract data in FIG. 11.

Figure 23:
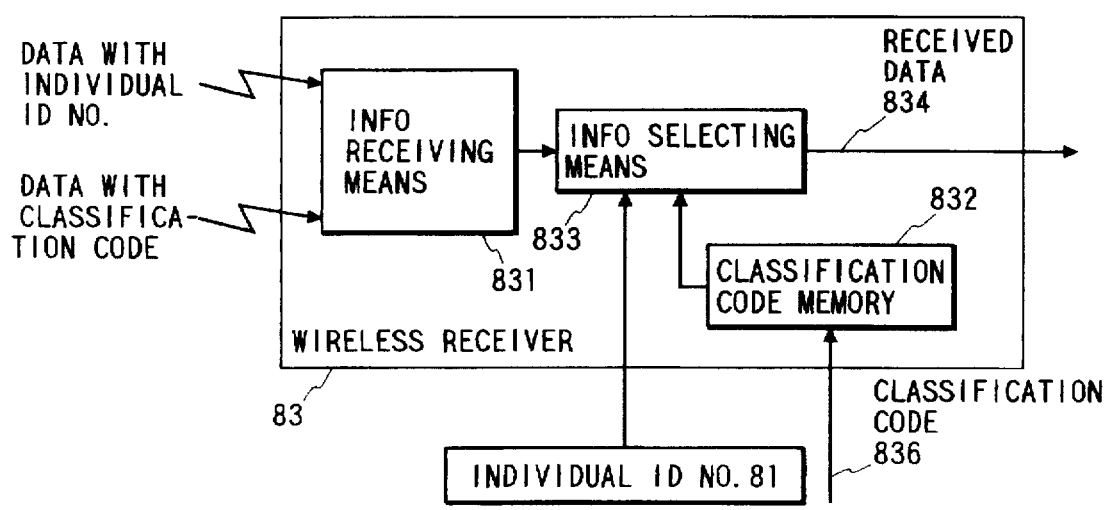
FIG. 23 is a block diagram of a wireless receiving unit.

As seen in FIG. 23, the wireless receiving unit 83 has an information receiving means 831 for receiving radio waves containing information transmitting data including an individual identification number transmitted from the wireless transmitting unit 62 described above and radio waves containing transmitting data including a sorting code transmitted from the data broadcasting transmitting means 837. The information receiving means 831 amplifies and demodulates the received radio waves to reproduce the transmitted data. A sorting code storing unit 832 stores the information sorting code 836 required to be acquired, as specified from the terminal operating unit 835. An information selecting means 833 selects the transmitted data to which is added the individual identification number 81 agreeing with the individual identification number 81 of the portable information terminal 8 and the transmitted data to which is added the sorting code 836 agreeing with the sorting code 836 required to be acquired, and outputs the data following the identification number and the sorting code as the received data 834.

Since the other elements of the system are the same as those of FIG. 1, an explanation thereof will be omitted, and a redundant explanation of parts having the same reference characters also will be omitted.

Assuming that a user 1 commutes by train from a middle scale railroad station, description will be made concerning the information transmission when the user obtains successive special information in regard to an event which has occurred before the user leaves his or her house.

The user 1 sets the sorting code for the special information in regard to the event which the user wants to receive, for example, the sorting code indicating "event news", by operating the terminal operating unit 835 of the portable information terminal 8 to specify a classification of special information which the user wants to receive from the data broadcast transmitting means 837. As the sorting code 836 is set, the portable information terminal 8 is set in a state capable of receiving the transmitted data to which is added the corresponding sorting code 836 transmitted from the data broadcast transmitting means 837. When the user 1 passes the portable memory medium 2 through the reading-out apparatus 3 at a ticket checking gate in the railroad station, the portable information terminal 8 prepares to receive the transmitted data to which is added the corresponding individual identification number 81 in the front portion of the data in the same manner as in the first embodiment described above.

As the system management apparatus 7 receives the identification number 21 and the contract data 22 from the reading-out apparatus 3, the system management apparatus 7 extracts information 41 based on the contract data 22 from the information storing apparatus 4 and adds the individual identification number 81 to the data transmitted from the wireless transmitting unit 62, and, at the same time, extracts information 41 of various kinds of sorting codes 836 and adds said sorting codes 836 to the information transmitted from the data broadcast transmitting means 837.

Since the portable information terminal 8 carried by the user moving from the ticket checking gate toward a platform is in a stand-by state for receiving, the portable information terminal 8 starts the receiving process when the radio waves begin coming from the wireless transmitting unit 62 and the data-broadcast transmitting means 837. Initially, the information receiving means 831 of the wireless receiving unit 83 demodulates the received radio waves to extract the transmitted data, and the transmitted data is input to the information selecting means 833. The information selecting means 833 checks the individual identification number 81 and the sorting code 836 of the transmitted data with the individual identification number 81 and the sorting code 836 set in the portable information terminal 8. If the individual identification number 81 and the sorting code 836 agree with those set to the portable information terminal 8, the data following to the individual identification number 81 and the sorting code 836 is acquired and transmitted to the information storing unit 85 as the received data 834. If not, the data is ignored.

The information storing unit 85 stores the received data 834 acquired by the information selecting means 833, and is displayed on the information displaying unit 84 corresponding to an instruction input from the terminal operating unit 835. Therefore, the user can obtain and read the special information in addition to the information requested in accordance with the contract in advance.

Although the portable information terminal 8 in this embodiment is automatically brought into a stand-by state for receiving the transmitted data to which is added the sorting code 836 as the sorting code 836 requested to be obtained is set, it is preferable for decreasing the consuming electric power that the user may cause the receiving period or the service region or the service period to be automatically detected to bring the portable information terminal into the stand-by state.

In this embodiment, the data broadcast transmitting means 837 is a means capable of transmitting data within a limited region, such as a railroad station. However, since the data (information) transmitted from the data broadcast transmitting means 837 is not for a specified portable information terminal 8, the information service can be enriched by allowing the transmitting means to broadcast to a wider region similar to a common radio broadcast so as to provide a type of general information delivery service.

Further, since the information service using the sorting code 836 is a data obtaining function based on a voluntary selection of a user, it is difficult to demand payment for the service. Therefore, it is preferable to add to the portable information terminal 8 a service payment collecting means for extracting a fee for each sorting code from a pre-paid card, or to employ a method of settling accounts at the time of renewing the contract by storing accumulated service charges for the data received during the term of contract in the portable information terminal 8 as, for example, in the first embodiment, or to employ a method of automatically drawing a service payment from an account in a bank by connecting the portable information terminal 8 to the information service supplier using a data communication system, such as a telephone network, to access the bank accounts.

While, in this embodiment, the information including the individual identification number 81 and the information including the sorting code 836 are separately transmitted using individual transmitting means 62 and 837, it is possible to transmit the information, including an individual identification number 81 followed by a sorting code 836 to deal with both the information corresponding to the individual identification number 81 and the information corresponding to the sorting code 836 in the wireless transmitting unit 62 and by using a data format such as shown in FIG. 26. In this case, the portable information terminal 8 first checks the individual identification number 81 of the transmitted data in the information selecting means 833 to select said transmitted data, then further checks the selected data to extract data corresponding to the specified sorting code 836 as the received data 834. By doing so, only the data relating to required information is extracted. On the other hand, by specifying sorting codes for information not required, the information selecting means 833 can prevent extracting transmitted data accompanying the corresponding sorting codes. By employing either of the methods, the memory capacity of the information storing unit 85 can be effectively used, since the transmitted data relating to unnecessary information is not acquired.

[Sixth Embodiment]

Figure 27:
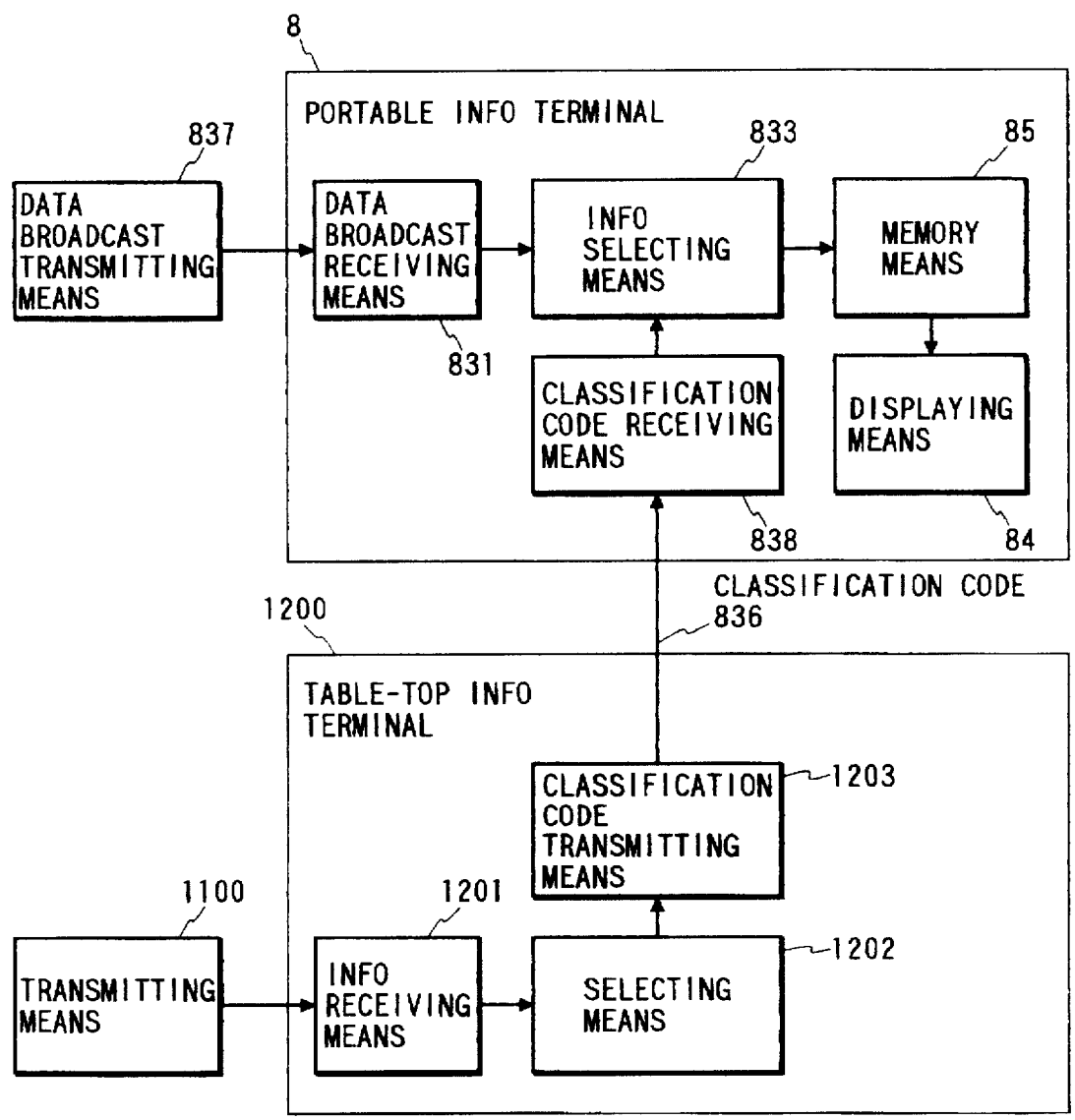
FIG. 27 is a block diagram showing a sixth embodiment of an information delivery system in accordance with the present invention.
Figure 28:
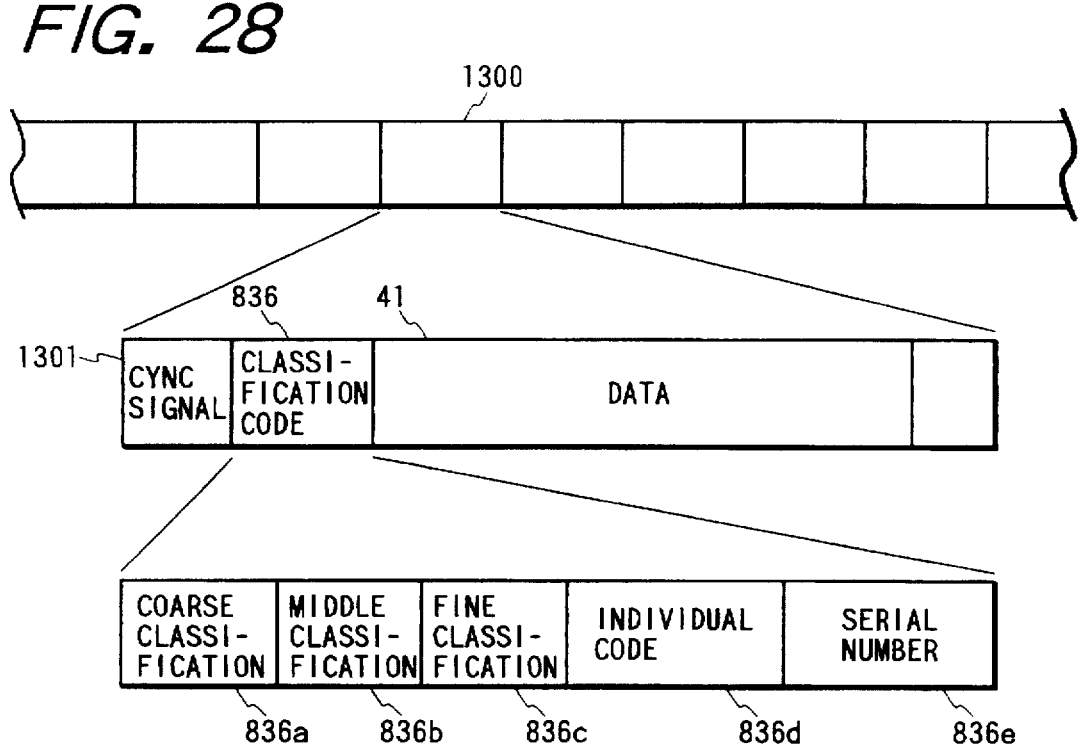
FIG. 28 is a data format diagram for transmitting data.
Figure 29:
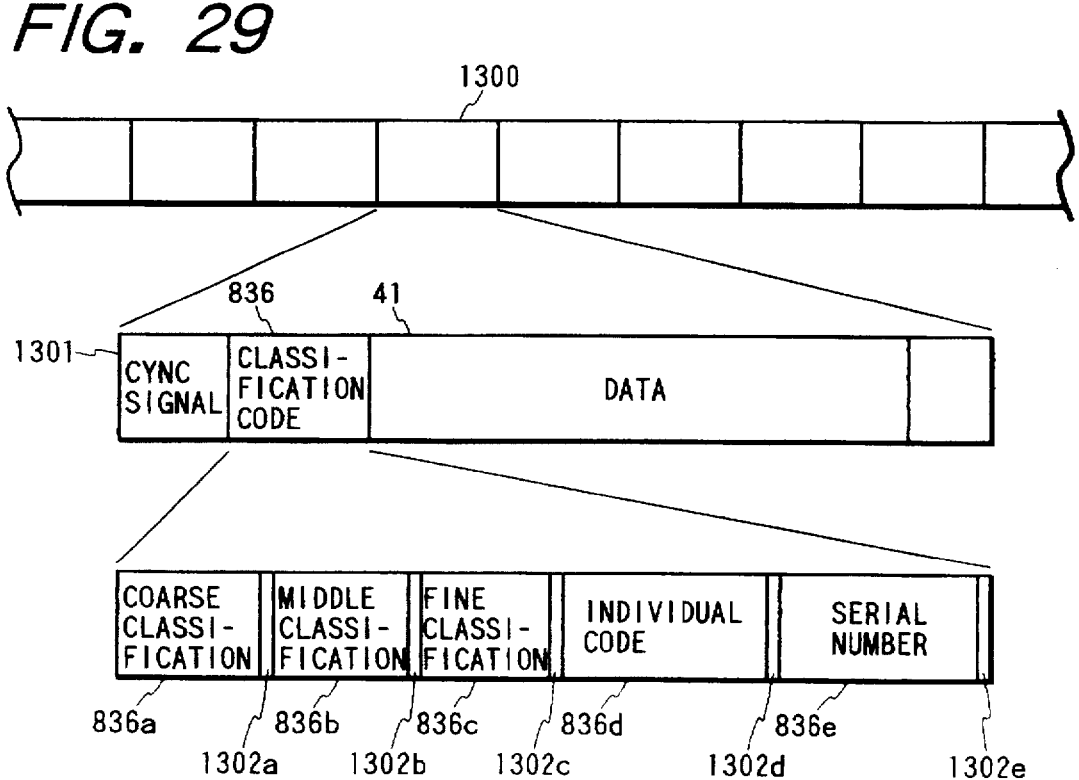
FIG. 29 is a data format diagram for transmitting data.

FIG. 27 is a block diagram of another embodiment of an information delivery system in accordance with the present invention. FIG. 28 and FIG. 29 are data formats for transmitting data used in this embodiment.

This embodiment is an information delivery system wherein, by providing a data broadcast transmitting means for intermittently broadcasting classified information, to which is added sorting codes, to a wide region without specifying information terminals, when each portable information terminal receives transmitted data having a sorting code which agrees with the preset sorting code according to certain requested information in the terminal, the portable information terminal acquires the data and supplies it to the user.

The reference character 1100 denotes an information transmitting means linked with the system management apparatus in the same manner as in the aforementioned embodiments, and the reference character 1200 denotes an installation type information terminal. The installation type information terminal 1200 has an information receiving means 1201, a selecting means 1202, and a sorting code transmitting means 1203. The data broadcast transmitting means 837 broadcasts information to which is added a sorting code linking with the system management apparatus in the same manner as in the aforementioned embodiments. The portable information terminal 8 has a sorting code receiving means 838 which receives the sorting code 836 transmitted from the sorting code transmitting means 1203 of the installation type information terminal 1200 and sets the sorting code into the information selecting means 833. And, the data broadcast receiving means 831 receives the data which has been broadcasted from the data broadcast transmitting means 837 and transmits this data to the information selecting means 833. The information selecting means 833 acquires the data to which the sorting code has been added and which agrees with the preset sorting code 836 and stores the data in the storing means 85. The display means 84 displays the data stored in the storing means 85.

FIG. 28 and FIG. 29 are examples of data formats for data transmitted from the data broadcast transmitting means 837. Initially, FIG. 28 and FIG. 29 will be explained, and then the operation will be described, referring to FIG. 27.

The data format is constructed as a repetition of signals having a certain length called "frames". The reference character 1300 shows a frame. One article of information is transmitted by one frame. As a result, plural articles of information are successively transmitted. The frame 1300 is composed of plural areas.

The reference character 1301 denotes a sync signal, and a specific signal is repeated at a certain interval. The reference character 836 denotes a sorting code which is used for discriminating the data in the following data area. The reference character 41 denotes a data area. Further, the sorting code 836 is divided into plural areas, for instance, coarse classification 836a, middle classification 836b, fine classification 836c, individual number 836d, and serial number 836e. Here, an article of sport news on soccer is taken as an example. A sorting code indicating an article of news is written in the coarse classification 836a, a sorting code indicating sport information is written in the middle classification 836b, and a sorting code indicating soccer is written in the fine classification 836c. Further, the individual number 836d indicates an article concerning a game between A and B teams on a particular day. In the serial numbers 836e, articles on the game are identified by serially increasing numbers from the first article.

A series of news articles occur with the passage of time. There arise articles of news with the passage of time, for example, information on starting members before the game, information on a score, information on a change in members, the result of the game, and an interview with a manager of the winning team. The articles are transmitted from the data broadcast transmitting means 837, for example, in the form of textual information when each of the events occurs. Therefore, the news article is not transmitted at a determined time. In the system of this embodiment, once one of the sorting codes for news articles is detected, the news articles released after that are automatically obtained.

Further, there is another type of format in which each of the sorting codes have error correction codes 1302a to 1302e appended thereto, as shown in FIG. 29. By transmitting the data with the error codes, there is an advantage in that the reliability of the received sorting codes is improved and, accordingly, the certainty of obtaining the news articles can be improved.

A procedure for obtaining an article of information will be described below, referring to FIG. 27. Information is transmitted from the information transmitting means 1100 to an installed type terminal 1200, such as a personal computer in an office or a house. An example of a transmitting means involving a communication network is a telephone network, and an example of an information service is a personal computer communication. A computer network is another example. An example of information is a news article. The news articles are transmitted along with sorting codes having the same function as the sorting code 836 described above. In the terminal 1200, the transmitted news articles are displayed on a display unit (not shown) as textual information. News articles the user wants to successively obtain are selected among the transmitted news articles, if necessary. A selecting means 1202 is provided for performing a series of selection processes. The selecting means 1202 extracts the sorting code 836 attached to the news article to transmit it to a portable information terminal 8 through a sorting code transmitting means 1203. That is, as the user selects his or her requested articles among the transmitted news articles, all the sorting codes 836 corresponding to these requested articles are transmitted to the portable information terminal 8. The transmitting means may involve transmission of data by wire, wireless, or infrared ray. The sorting codes transmitted from the terminal 1200 to the portable information terminal 8 are received by the sorting code receiving means 838 and are stored therein.

On the other hand, the news article is transmitted from the data broadcast transmitting means 837 with sorting codes having the same function as the aforementioned sorting codes. In the portable information terminal 8, the information is received by the data broadcast receiving means 831 and supplied to the information selecting means 833. In the information selecting means 833, the sorting code attached to the received information is checked against the sorting code transmitted from the terminal 1200 in advance. When the sorting codes agree with each other, the corresponding news article is acquired and stored in the storing means 85. Since a current news article is successively transmitted from the data broadcast transmitting means 837, after a certain elapsed time, the portable information terminal 8 will have received the latest set of news articles in the storing means 85, and the articles are stored in the order of the storing time. After a certain elapsed time, the user can obtain the latest information carried by the news articles having the objective sorting code. By carrying the portable information terminal 8 outside, the user can automatically and successively obtain a news article he wants to the full extent of the region where the radio waves reach. Therein, there is no need to access to an information source every time the user wants to obtain a news article. That is, since the portable information terminal 8 can be used outside, the user can obtain the latest news article of a desired subject anywhere and at anytime. In order to signify the receiving of a news article, the portable information terminal 8 may sound an alarm or be vibrated or display the receiving of the news article on the displaying unit every time a desired news article is received. Further, when the portable information terminal is in a stand-by state waiting for plural kinds of news articles, it is possible to discriminate the notice indicating the receipt of news articles depending on the kinds of articles.

Figure 30:
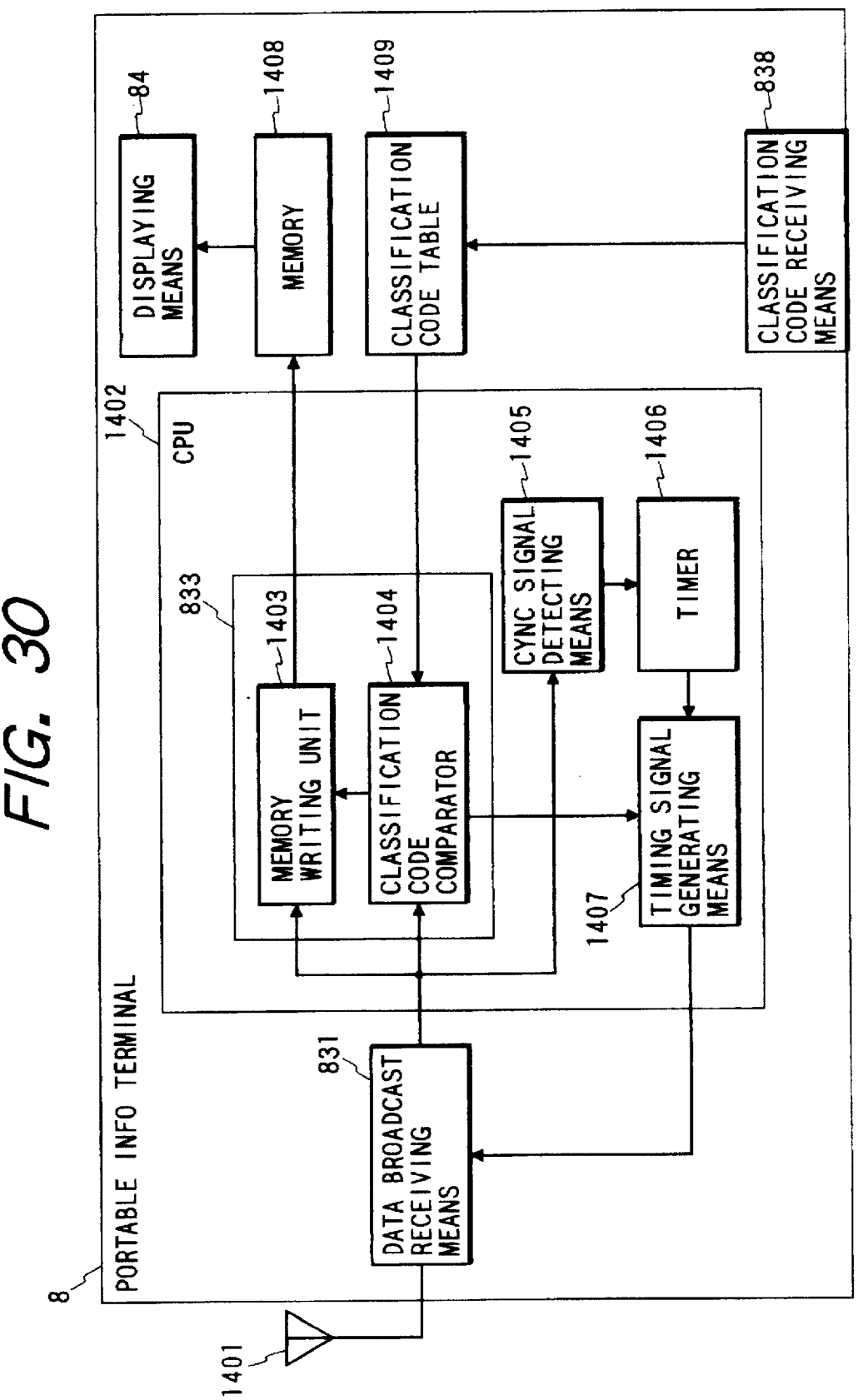
FIG. 30 is a block diagram showing the construction of a portable information terminal in detail.

The operation of intermittently receiving information in the portable information terminal in this system will be described below. FIG. 30 is a block diagram showing the construction of the portable information terminal 8 shown in FIG. 27 in more detail. The terminal 8 includes an antenna 1401, a CPU 1402, a memory writing unit 1403, a sorting code comparing unit 1404, a sync signal detecting unit 1405, a timer 1406, a timing signal generating unit 1407, a memory 1408, and a sorting code table 1409. Among these units, the units functioning in the CPU 1402 are indicated inside the block of the CPU 1402. The information selecting means 833 is composed of the sorting code comparing unit 1404 and the memory writing unit 1403.

The selected sorting codes 836 are received by the sorting code receiving means 838 and stored in the sorting code table 1409. The sorting codes 836 stored in the sorting code table 1409 are referred to in the sorting code comparing unit 1404 as necessary.

The signal received by the antenna 1401 is regenerated by the data broadcast receiving means 831 and is supplied to the CPU 142. Then, the following process is performed in the CPU 1402.

If all the sorting codes, other than the serial number, agree with the sorting codes stored in the sorting code table 1409, the sorting code comparing unit 1404 in the information selecting means 833 outputs a signal to the memory writing unit 1403 to write the data 41 of the frame 1300 and the sorting code 836 into the memory 1408.

If the sorting codes do not agree, the sorting code comparing unit judges that the received signal is not information for the news article being waited for, and outputs a signal to the timing signal generating unit 1407. The timing signal generating unit 1407 generates a timing signal so as to stop the circuit operation in the data broadcast receiving means 831 in the data area following the sorting code 836.

The sync signal detecting unit 1405 outputs an instruction to the timer 1406 when the sync signal 1301 is detected. The timer 1406 outputs an instruction to the timing signal generation unit 1407 so as to restart the circuit operation of the data broadcast receiving means 831 a certain time before the position for the next sync signal 1301. The data broadcast receiving means operates during the period when both of the sync signal 1301 and the sorting code 836 are transmitted and the sorting code 836 in the next frame 1300 is input to the information selecting means 833. By doing so, the consumption of electric power can be decreased since the circuit operation of the data broadcast receiving means 831 is stopped during the time of receipt of a news article not being waited for. The sorting codes are transmitted in order starting from the coarse classification as shown in FIG. 28. If a sorting code in an early stage does not agree, there is no need to receive the following sorting codes. Therefore, the consumption of electric power can be decreased by stopping the circuit operation of the data broadcast receiving means 831 the first time a sorting code does not agree.

The operation of the information selecting means 833 will be described below, referring to FIG. 31.

Figure 31:
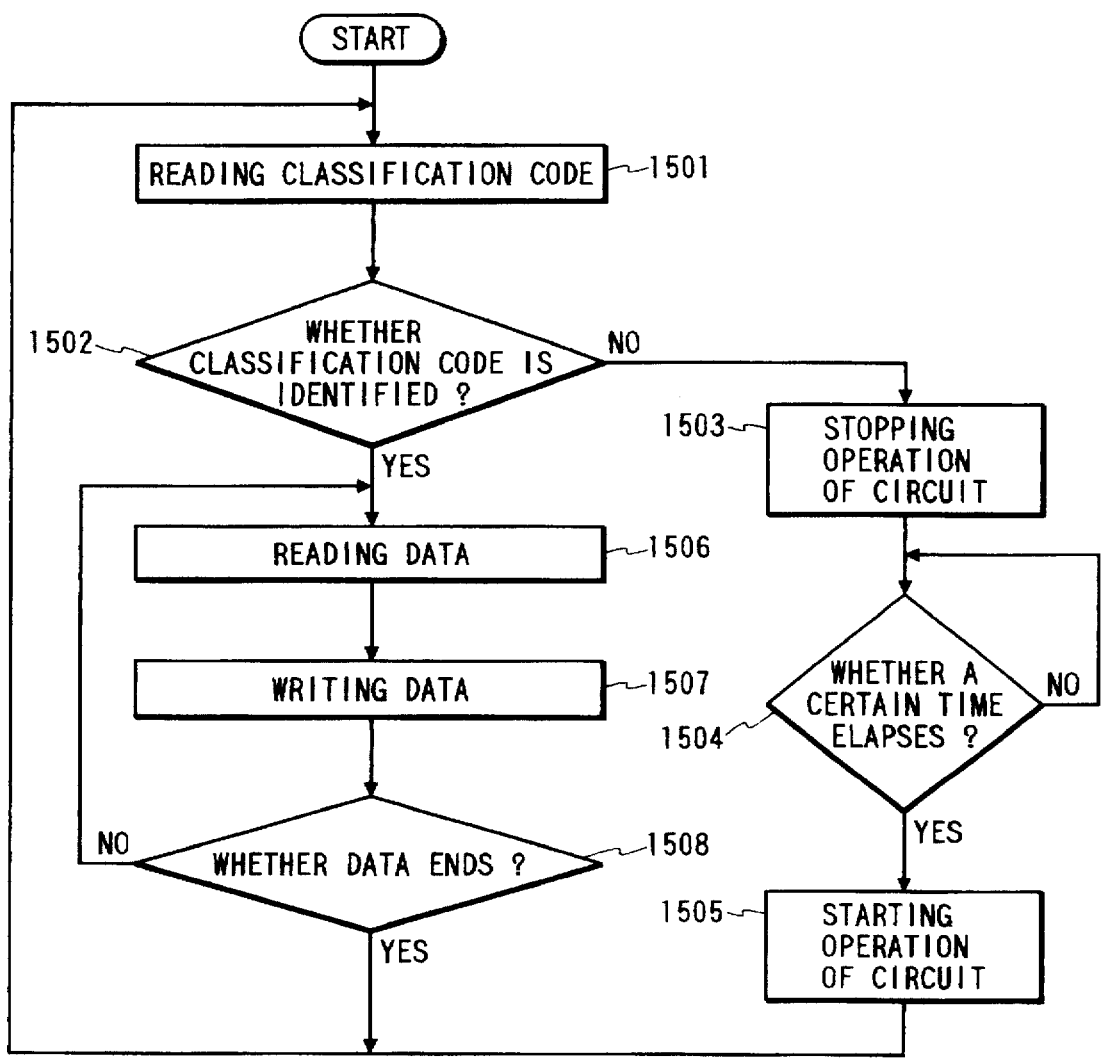
FIG. 31 is a flow chart showing a processing procedure for selecting information.

Initially, a sync signal in a format transmitted by data broadcast is detected to start the flow of information selection, as shown in FIG. 31.

Next, in step 1501, the sorting code following the sync signal is read in.

Then, in step 1502, the sorting code is checked with the sorting code stored in the sorting code table.

If the sorting codes do not agree, the processing proceeds to step 1503 to stop the circuit operation of the data broadcast receiving means. Then, in step 1504, a certain time until the frame is over is measured with the timer. After the certain time has elapsed, the processing goes to step 1505 to start the circuit operation of the data broadcast receiving means and returns to reading of a sorting code in the next frame.

On the other hand, if the sorting codes agree, the processing proceeds to step 1506 to read in the data following the sorting code, and further proceeds to step 1507 and step 1508 to repeat the operation of writing in the memory means until the transmitted data ends.

The above operation is repeated for every frame.

Figure 32:
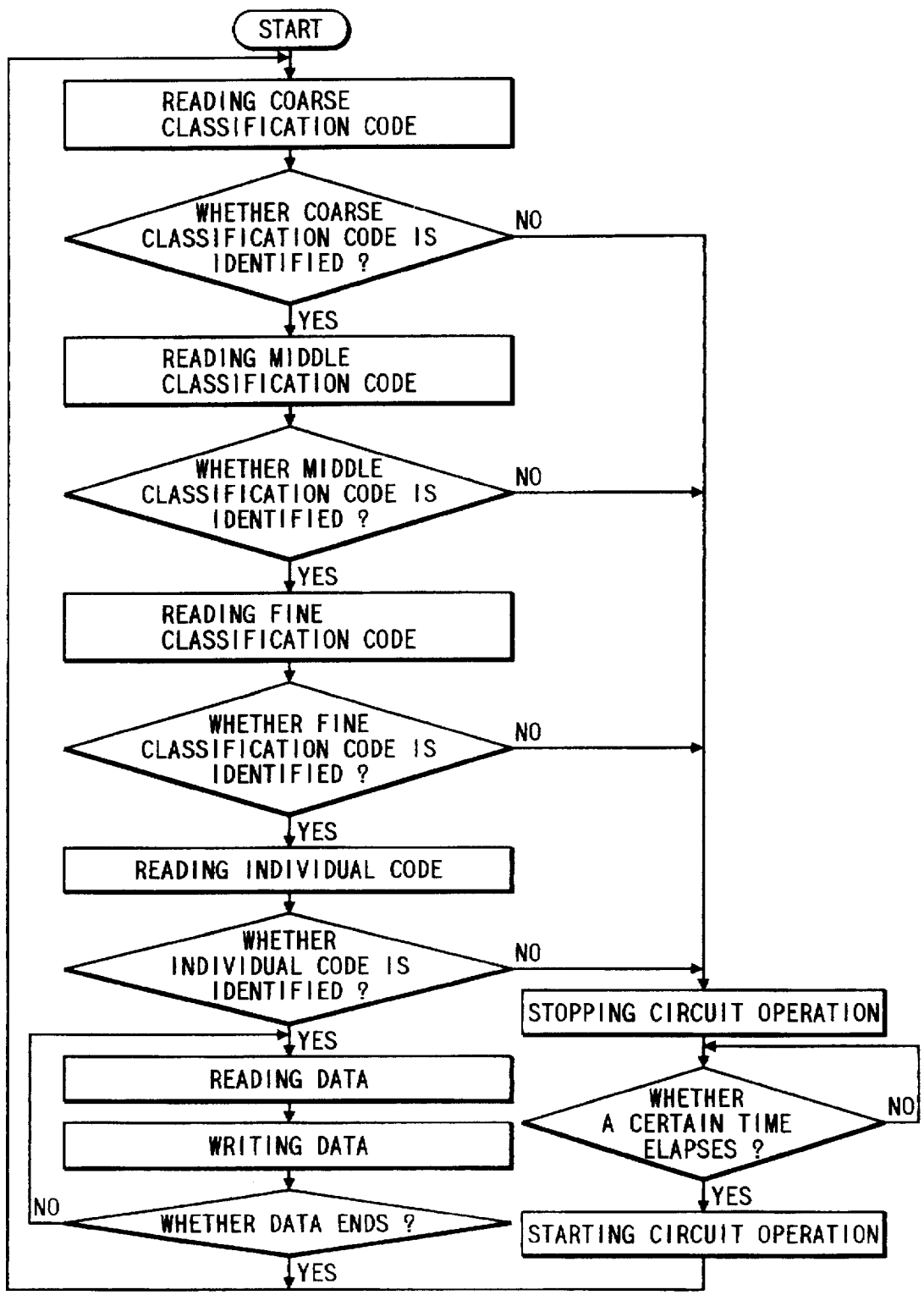
FIG. 32 is a flow chart showing a processing procedure for selecting information.
Figure 33:
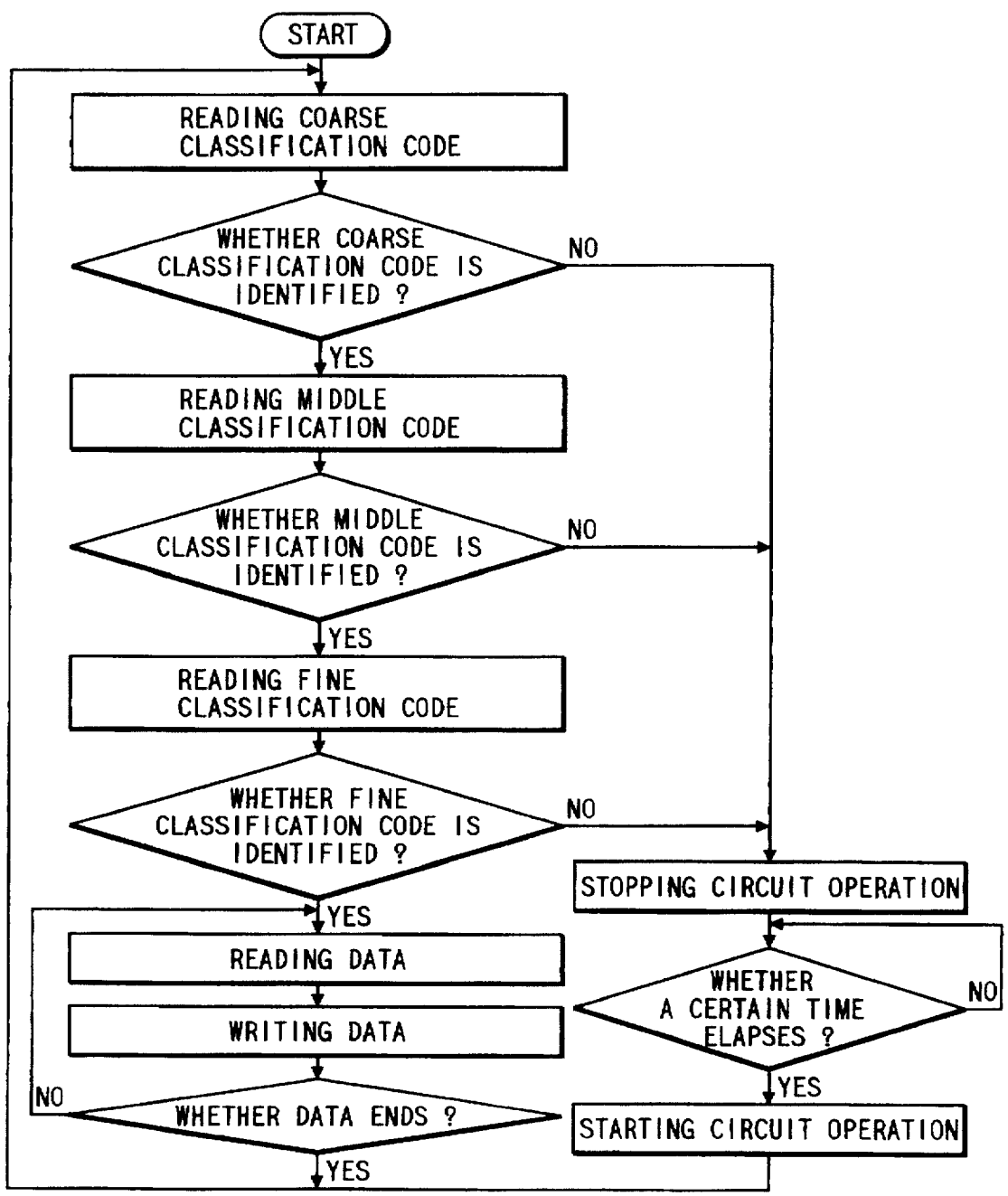
FIG. 33 is a flow chart showing a processing procedure for selecting information.

Since the sorting codes are classified into detailed kinds, as shown in FIG. 28 and FIG. 29, the intermittent operation becomes more effective if the circuit operation of the data broadcast receiving means is stopped at the time when it is judged that the sorting codes are different. The flow is shown in FIG. 32 and FIG. 33. The process procedure in FIG. 32 checks for agreement between all the sorting codes for coarse classification, middle classification and fine classification, and further checks the individual code in detail. The process procedure in FIG. 33 checks for agreement between only the sorting codes for coarse classification, middle classification and fine classification. In both of the cases of FIG. 32 and FIG. 33, since the checking is performed from the coarse classification, the intermittent operation becomes more effective in stopping the circuit operation of the data broadcast receiving means at the time when it is judged that the sorting codes are different.

An example of a method of payment will be described below. In a case of personal computer communication described above, the fee for the service is imposed at some time separately from the fee for using the network. It can be considered that, in the data broadcasting according to the embodiment, the service fee is imposed on the user. In this case, when the sorting code is obtained initially, the payment can be automatically performed on the side of the personal computer communication center. For example, in the first stage, the news articles are transmitted to the user without sorting codes. The user instructs the personal computer communication center that the user wants the sorting codes. Then, the sorting codes are transmitted from the personal computer communication center to the user. During that time, the personal computer communication center imposes a fee on the user. Using the obtained sorting codes, the user can obtain a news article corresponding to a selected sorting code among the information broadcasted from the data broadcast transmitting means. That is, the payment is performed by transferring the sorting code through personal computer communication.

The sorting codes are changed, for example, every day. By doing so, for instance, by setting the term of validity of the sorting code to one day in the portable information terminal 8, it is possible to prevent receiving unnecessary information using an erroneous sorting code.

Although software is used in the example of the information selecting means 833, payment using software is also possible.

According to this embodiment, once a user obtains a sorting code, the portable information terminal can always obtain the latest information as to a series of news articles corresponding to the sorting code. That is, as long as the portable information terminal is within an area where the radio waves reach, the desired latest news articles can be automatically obtained at any time and anywhere.

[Seventh Embodiment]

Figure 34:
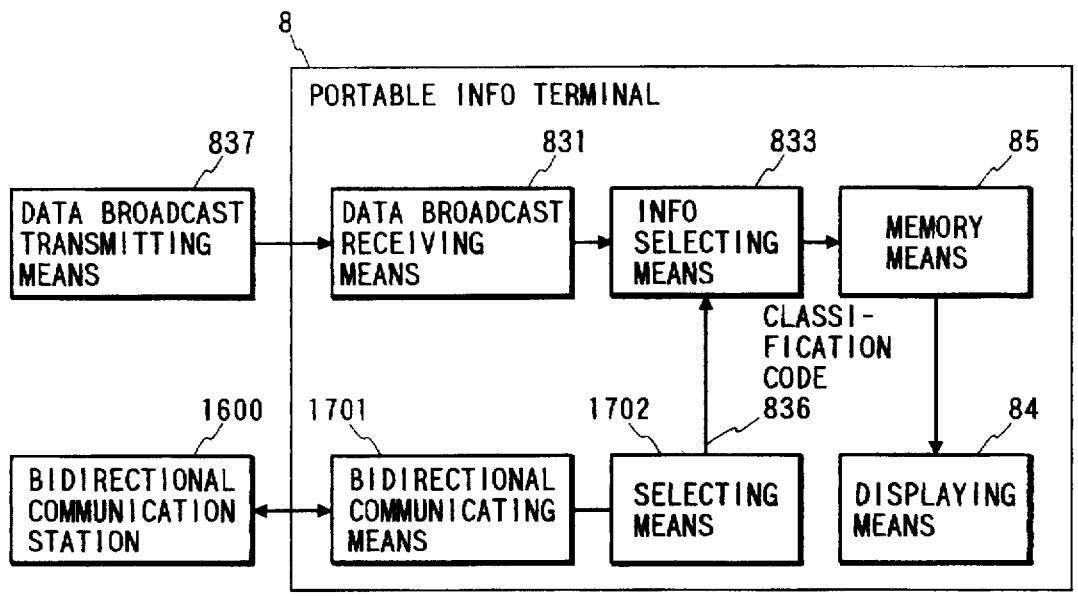
FIG. 34 is a block diagram showing a seventh embodiment of an information delivery system in accordance with the present invention.

FIG. 34 is a block diagram showing a further embodiment of an information delivery system in accordance with the present invention.

The reference character 1600 denotes a bi-directional communication base station for portable telephones and car telephones. The reference character 1701 denotes a bi-directional communicating means for exchanging voice and data by communicating with the bi-directional communication base station 1600. By using the bi-directional communicating means 1701, the bi-directional communication base station 1600 is connected to the aforementioned personal computer communication center. That is, the difference in this embodiment from the embodiment of FIG. 27 is that the portable information terminal 8 itself communicates with the personal computer communication center to set the sorting code.

The personal computer communication center transmits, for example, a news article obtained from a current news report to which there is appended a sorting code 836, described in the previous embodiment, through the bi-directional communication base station 1600. The portable information terminal 8 receives the news article along with the sorting code. The selecting means 1702 extracts the sorting code 836 attached to the news article selected by a user, and the sorting code is transmitted to the information selecting means 833. Then, as described in the previous embodiment, the information selecting means acquires only a news article accompanying a sorting code 836 which agrees with the set sorting code among the news articles broadcasted from the data broadcast transmitting means 837, and stores the acquired news article in the storing means 85.

As described above, since the portable information terminal 8 itself in this embodiment can set the sorting code, in addition to the effect described in the previous embodiment, there is also an effect in that it is possible to set a sorting code 836 for obtaining a required news article at any time and anywhere.

Figure 35:
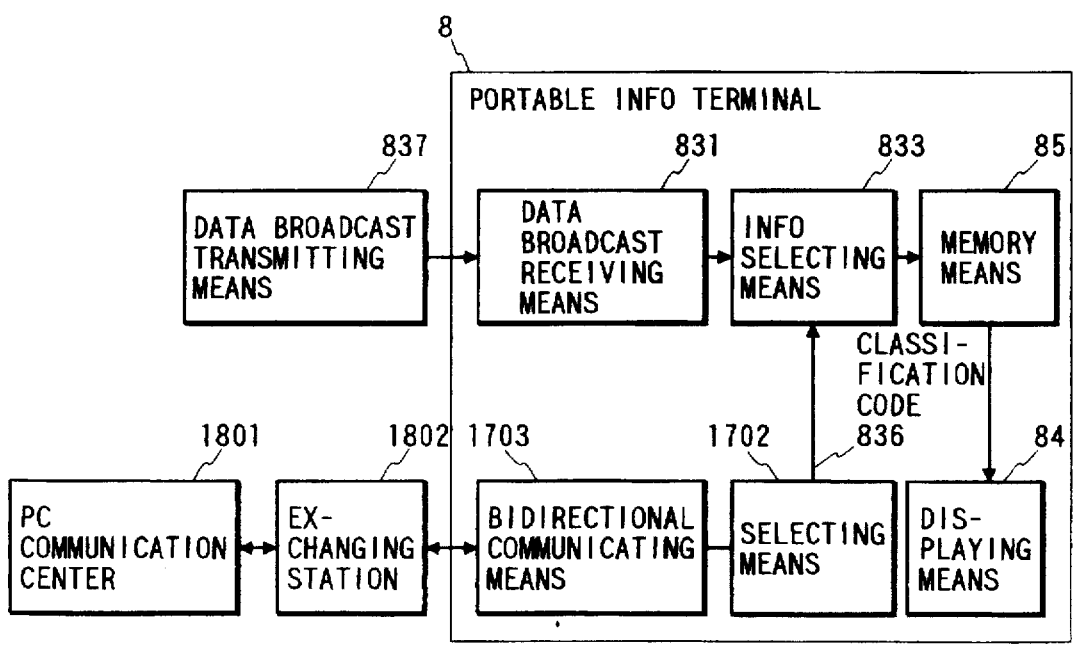
FIG. 35 is a block diagram showing a modified information delivery system in accordance with the present invention.

FIG. 35 is a block diagram showing a modified arrangement of the information delivery system of FIG. 34, in accordance with the present invention.

The difference over the embodiment of FIG. 34 is that a wired telephone network is used instead of using portable telephones or car telephones.

The reference character 1801 is a personal computer communication center, the reference character 1802 is an exchange station, the reference character 1703 is a bi-directional communication means. Although the bi-directional communication means such as portable telephones are used in the eleventh embodiment, in the twelfth embodiment a common subscriber line is used to connect to the personal computer center or the like. In other words, in the twelfth embodiment the using location is limited to an indoor room where the common subscriber line or the wired telephone network can be utilized. However, the telephone charge is extremely cheap comparing to the portable telephone network utilizing wireless facilities.

In this arrangement in comparison to that of FIG. 34, although the location to set the sorting code for the news article is limited, the same effect can be attained by connecting the portable information terminal 8 to a telephone network so as long as a telephone network is available.

[Eighth Embodiment]

Figure 36:
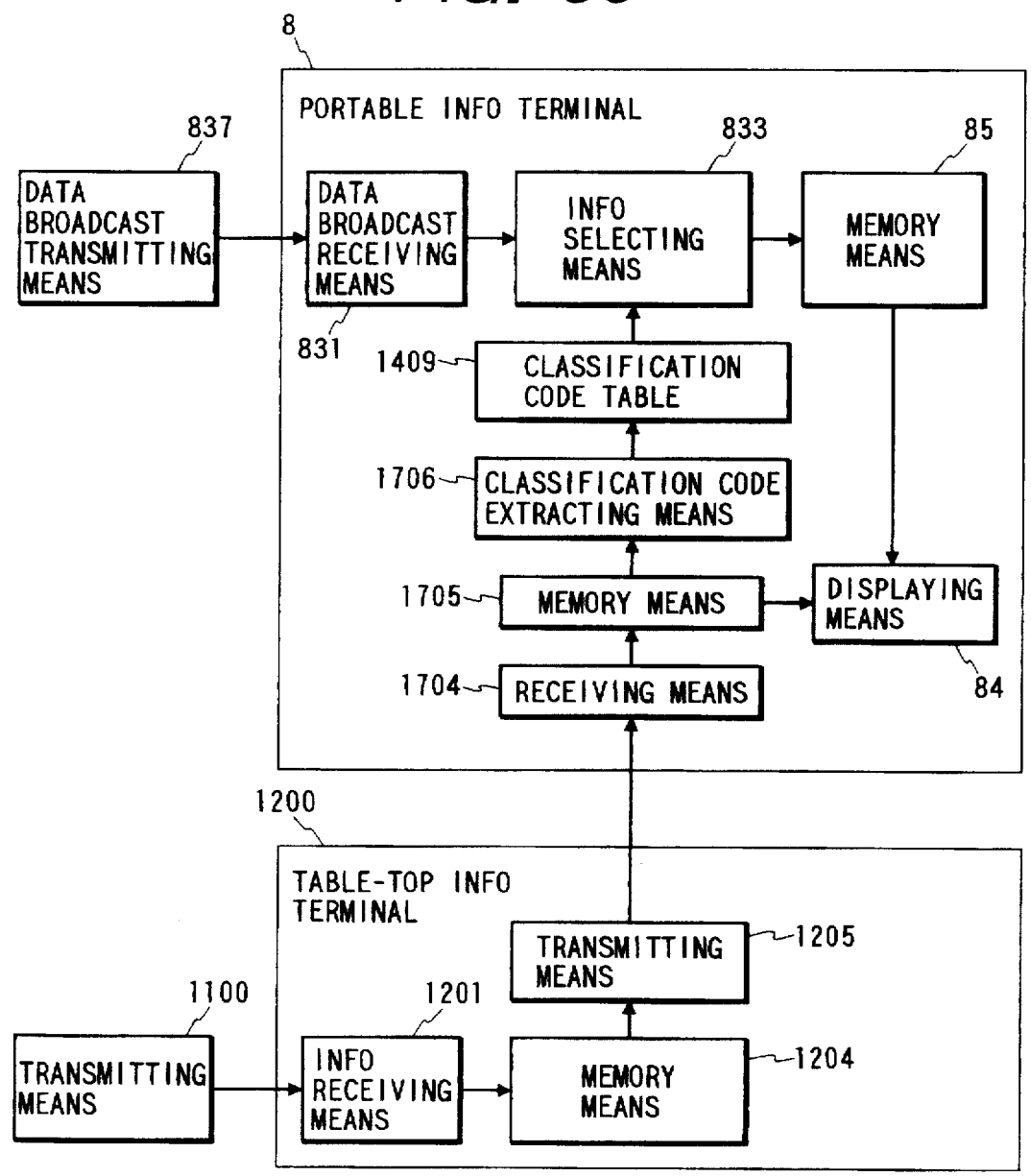
FIG. 36 is a block diagram showing an eighth embodiment of an information delivery system in accordance with the present invention.

FIG. 36 is a block diagram showing another embodiment of an information delivery system in accordance with the present invention.

The system includes a storing means 1204 capable of writing in and reading out, an information transmitting means 1205, an information receiving means 1704, a storing means 1705 capable of writing in and reading out, and an extracting means 1706. The reference character 1409 denotes a sorting code table.

In FIG. 36, the information transmitting means 1100 transmits information, such as news articles, containing sorting codes 836. In the portable information terminal 1200, the signals are received by the information receiving means 1201 and reproduced as data. The data is temporarily stored in the storing means 1204. The stored data is transmitted to the portable information terminal 8 through the transmitting means 1205. The portable information terminal 8 receives the transmitted data at the information receiving means 1704. The user can properly read the stored data in textual information form by displaying the data on the displaying means 84. The user selects desired data among the transmitted data to allow the sorting code extracting means 1706 to extract the sorting code 836 of the corresponding news article. The extracted sorting codes 836 are stored in the sorting code table 1409 as necessary. The information selecting means 833 compares the sorting codes 836 stored in the sorting code table 1409 with the sorting codes 836 of the news articles transmitted from the data broadcast transmitting means 837 to acquire those news articles having storing codes which agree and stores the articles into the storing means 85. After a certain time has elapsed, the news articles which the user requires are all stored in the storing means 85. The user can then read the news articles by displaying the stored data on the display unit 84. The following is an example of detailed use of the embodiment.

A certain volume of news articles are transmitted from the transmitting means 1100 through a telephone network and a computer network. As an example, it is assumed that a user desires to obtain all information on sport articles at his home on a certain day in the morning using the computer terminal 1200. In the computer terminal 1200, all the news articles transmitted are temporarily stored and then are transmitted to the portable information terminal 8. After that, the user successively displays the news articles on sports and designates the news articles which he wants to continuously obtain. For instance, in a case where there is an article on a soccer game to be held in the future, the user puts a mark on the news article. The sorting code 836 of the marked news article is set in the sorting code table 1409. After that, the news article on the game, among the news articles transmitted from the data broadcast transmitting means 837, is received and stored by the portable information terminal 8. The stored information is the latest and most current information since the data broadcast is utilized.

According to the this embodiment, there is an effect in that news articles continuously required can be selected using the portable information terminal 8 at a later time at ease from a massive amount of news articles having been acquired by the terminal in advance.

The description of this embodiment refers to a case of receiving news articles, as an example. As to news articles which are included in a data broadcast, there are both national scale news articles and local news articles. As to data broadcasting, there are systems such as satellite broadcasting systems, where broadcast is performed from one transmitting means, and a broadcasting system such as television broadcasting systems, where transmitting means are provided in individual areas to broadcast news articles partly including local special news. In the latter case, the contents are different in some cases depending on the areas even if the news article has the same sorting code. A typical example is a weather forecast in the area. Since the portable information terminal can be carried with the user, it is possible to receive a weather forecast in a local area by setting in advance an area of destination and receiving the weather forecast in that area of destination.

As to news articles, it is also possible to broadcast advertisements of services which are provided on a national scale and are limited to a local area. In a case of advertisements for products, a list of products may be automatically produced by attaching a sorting code to each kind of product. For example, on receiving a data broadcast using a sorting code for television, an advertisement of products on television of various manufacturers can be obtained after a certain time has passed. In a case of advertisements in a limited local area, information such as prices of goods at a retail shop can be broadcasted similar to an insert advertisement in a newspaper.

Further, broadcasted data other than textual information may be compressed picture information.

A portable information terminal for receiving a data broadcast as described in the above embodiments may be changed to a terminal of the type used in a home or in an office. In this case, it is possible to obtain the latest information easily and continuously though the movability is sacrificed.

According to the described embodiments, there is an effect in that a desired amount of the latest news can be automatically obtained at any time and anywhere with a portable information terminal receiving data broadcasted along with an individual sorting code for each news article by selecting news using the sorting codes obtained from other communication systems.

What is claimed is:

1. An information delivery system, comprising:
   a portable memory medium capable of being carried by a user for storing a plurality of items of data;
   reading-out apparatuses which are installed at all entrances and exits of a specified area for reading out data stored in said portable memory medium, said data being a different type of data other than entry/exit data for said specified area;
   an information storing apparatus for storing various kinds of information;
   an information management apparatus for controlling said information storing apparatus;
   a transmitting management apparatus for transmitting over the air in said specified area information read out from said information storing apparatus by the information management apparatus;
   a portable information terminal capable of being carried by said user for receiving and displaying the information transmitted from said transmitting management apparatus over the air and having an identification number to identify the portable information terminal; and
   a system management apparatus for effecting overall system control, wherein:
   said portable memory medium stores terms of a contract to supply information to the user and an identification number corresponding to said portable information terminal;
   said reading-out apparatuses include means for reading out the terms of the contract and the corresponding portable information terminal identification number stored in said portable memory medium;
   said information management apparatus includes means for reading out information according to the terms of the contract from said information storing apparatus;
   said transmitting management apparatus includes means for transmitting information read out by the information management apparatus and the identification number read out by said reading-out apparatuses at least to said specified area over the air; and said portable information terminal includes means for receiving and displaying information, transmitted by said transmitting management apparatus, when said identification number included in said information agrees with the identification number of said terminal.

2. An information delivery system, comprising:

a portable memory medium capable of being carried by a user for storing a plurality of items of data and having a function to transmit and receive data over the air;

reading-out apparatuses which are installed at all entrances and exits of a specified area for reading out data stored in said portable memory medium through wireless transmission and for receiving information from said portable memory medium, said data being a different type of data other than entry/exit data for said specified area;

an information storing apparatus for storing various kinds of information;

an information management apparatus for controlling said information storing apparatus;

a transmitting management apparatus for transmitting over the air in said specified area information read out from said information storing apparatus by the information management apparatus;

a portable information terminal capable of being carried by said user for receiving and displaying information transmitted from said transmitting management apparatus over the air and having an identification number to identify the portable information terminal; and a system management apparatus for effecting overall system control, wherein:

said portable memory medium stores terms of a contract to supply information to the user and an identification number corresponding to said terminal;

said reading-out apparatuses include means for reading out the terms of the contract and the corresponding portable information terminal identification number stored in said portable memory medium by communicating with said portable memory medium in said specified area;

said information management apparatus includes means for reading out information according to the terms of the contract from said information storing apparatus;

said transmitting management apparatus includes means for transmitting information read out by the information management apparatus and the identification number read out by said reading-out apparatuses at least to said specified area over the air; and said portable information terminal includes means for receiving and displaying information, transmitted by said transmitting management apparatus, when said identification number accompanying said information agrees with the identification number of said terminal.

3. An information delivery system, comprising:

a portable information terminal for storing and keeping a plurality of items of data and having a function to transmit and receive data over the air and a function to display received data;

reading-out apparatuses which are installed at all entrances and exits of a specified area for reading out data stored in said portable information terminal through wireless transmission and for receiving information from said portable information terminal, said data being a different type of data other than entry/exit data for said specified area;

an information storing apparatus for storing various kinds of information;

an information management apparatus for controlling said information storing apparatus;

a transmitting management apparatus for transmitting over the air in said specified area information read out from said information storing apparatus by the information management apparatus; and a system management apparatus for effecting overall system control, wherein:

said portable information terminal stores terms of a contract to supply information to the user and an identification number to specify said terminal in advance;

said reading-out apparatus includes means for reading out the terms of a contract and a specifying identification number stored in said portable information terminal by communicating with said portable information terminal in said specified area;

said information management apparatus includes means for reading out information according to the terms of the contract from said information storing apparatus;

said transmitting management apparatus includes means for transmitting information read out by the information management apparatus and the identification number to said specified area over the air; and said portable information terminal includes means for receiving and displaying information, transmitted by said transmitting management apparatus, when said identification number included in said information agrees with the identification number of said terminal.

4. An information delivery system, comprising:

a portable memory medium capable of being carried by a user for storing and keeping a plurality of items of data;

input/output apparatuses installed at all entrances and exits of a specified area for reading out data from and writing data to said portable memory medium, said data being a different type of data other than entry/exit data for said specified area;

an information storing apparatus for storing various kinds of information;

an information management apparatus for controlling said information storing apparatus;

a portable information terminal for displaying the contents stored in said portable memory medium; and a system management apparatus for effecting overall system control, wherein:

said portable memory medium stores terms of a contract to supply information to the user;

said input/output apparatus includes means for reading out the terms of the contract stored in said portable memory medium in said specified area;

said information management apparatus includes means for reading out information according to the terms of a contract from said information storing apparatus; and said input/output apparatuses further includes means for writing information read out from said information storing apparatus in said portable memory medium.

5. An information delivery system according to either one of claim 1 and claim 2, wherein said portable memory medium and said portable information terminal are both set to have corresponding identification numbers, said reading-out apparatuses being located at all entrances and exits of said specified area and include means for checking the identification number set to said portable memory medium against the identification number set to said portable information terminal.

6. An information delivery system according to any one of claim 1 to claim 3, wherein said transmitting management apparatus comprises a plurality of transmitting channels, said reading-out apparatuses include means for supplying data in regard to a transmitting channel to be used for information transmission to said portable information terminal at an entrance of said specified area.

7. An information delivery system according to any one of claim 1 to claim 4, wherein said information management apparatus includes means for adding to the information a message in regards to a usable term of the information delivery system or to indicate a renewing of the usable term.

8. An information delivery system according to any one of claim 1 to claim 4, wherein said information management apparatus includes means for analyzing textual information to convert a sentence composed of Chinese characters and Japanese cursive syllabaries into a sentence composed of Japanese cursive syllabaries, and means for transmitting said sentence composed of the Japanese cursive syllabaries to the portable information terminal in forms of voice and braille.

9. An information delivery system according to any one of claim 1 to claim 4, wherein said information management apparatus includes means for aquiring external information belonging to an external system.

10. An information delivery system according to any one of claim 1 to claim 4, wherein said specified area is a location including a facility which is used by the user in the course of the user's ordinary activities but restricts the user's range of movement.

11. An information delivery system according to any one of claim 1 to claim 4, wherein said information is digital data or analog data expressing information at least one of character, figure and voice form.

12. An information delivery system according to any one of claim 1 to claim 4, wherein said specified area is a railroad station yard.

13. An information delivery system according to any one of claims 1 to 4, wherein either one of said portable memory medium and said portable information terminal stores data regarding functions in connection with said portable information terminal, said stored data being read out by said reading-out apparatuses which are installed at all entrances and exits of said specified area, said information management apparatus reading out information corresponding to the items of said contract from said information storing apparatus and additional information data corresponding to the function of said portable information terminal based on the stored functional data when said information management apparatus receives said functional data.

14. An information delivery system, comprising:

an information storing apparatus for storing various kinds of information;

a system management apparatus for obtaining information from said information storing apparatus;

a transmitting management apparatus for transmitting information obtained by said system management apparatus over the air;

a portable information terminal capable of being carried by a user for receiving and displaying the information transmitted over the air from said transmitting management apparatus and for storing an identification number specifying said terminal and a sorting code corresponding to information selected by the user;

a portable memory medium capable of being carried by the user for storing terms of a contract in regards to information to be received by the user and an identification number corresponding to said portable information terminal; and reading-out apparatuses which are installed at all entrances and exits of a specified area for reading out data stored in said portable memory medium, said data being a different type of data other than entry/exit data for said specified area, and for transmitting the data to said system management apparatus; wherein said system management apparatus includes means for acquiring specified information according to the terms of said contract read out by said reading-out apparatus and unspecified information from said information storing apparatus;

said transmitting management apparatus includes means for transmitting said unspecified information together with the sorting code of said information and said specified information together with the identification number read out from said reading-out apparatuses at least to said specified area over the air; and said portable information terminal includes means for receiving and storing the information corresponding to said sorting code and said identification number transmitted from said transmitting management apparatus which agree with the sorting code and the identification number stored in said portable information terminal, and for displaying said stored information.

* * * * *